US011865716B2

(12) United States Patent
Mehr

(10) Patent No.: US 11,865,716 B2
(45) Date of Patent: Jan. 9, 2024

(54) PART FORMING USING INTELLIGENT ROBOTIC SYSTEM

(71) Applicant: Machina Labs, Inc., Los Angeles, CA (US)

(72) Inventor: Edward Mehr, Los Angeles, CA (US)

(73) Assignee: Machina Labs, Inc., Los Angeles, CA (US)

( * ) Notice: Subject to any disclaimer, the term of this patent is extended or adjusted under 35 U.S.C. 154(b) by 0 days.

(21) Appl. No.: 17/570,240

(22) Filed: Jan. 6, 2022

(65) Prior Publication Data

US 2022/0212341 A1 Jul. 7, 2022

Related U.S. Application Data

(60) Provisional application No. 63/134,571, filed on Jan. 6, 2021, provisional application No. 63/134,572, filed
(Continued)

(51) Int. Cl.
*B25J 9/16* (2006.01)
*B25J 11/00* (2006.01)
(Continued)

(52) U.S. Cl.
CPC ............ *B25J 9/163* (2013.01); *B23Q 3/1554* (2013.01); *B24B 1/04* (2013.01); *B25J 9/0087* (2013.01);
(Continued)

(58) Field of Classification Search
CPC ........ B25J 9/163; B25J 9/0087; B25J 9/1653; B25J 9/1664; B25J 9/1682; B25J 9/1697;
(Continued)

(56) References Cited

U.S. PATENT DOCUMENTS 11,413,747 B2 * 8/2022 Luis y Prado ....... B25J 11/0055
2008/0103741 A1 * 5/2008 Fukaya .............. G05B 19/4069
703/7
(Continued)

FOREIGN PATENT DOCUMENTS

WO    WO 2020/185807 A1    9/2020

OTHER PUBLICATIONS

Belchior, J et al. "Off-Line Compensation of the Tool Path Deviations on Robotic Machining: Application to Incremental Sheet Forming." Robotics and Computer-Integrated Manufacturing, vol. 29, No. 4, Aug. 2013, pp. 58-69.
(Continued)

*Primary Examiner* — Abby Y Lin
*Assistant Examiner* — Esvinder Singh
(74) *Attorney, Agent, or Firm* — Fenwick & West LLP

(57) ABSTRACT

A system forms a part in an initial geometry (e.g., a sheet) into a desired geometry. The system includes a robot arm with an end effector, a model and a controller. The model receives an input geometry and an input parameter value indicating an interaction between the part and the end effector. The model determines an output geometry of the part based on the input geometry and the input parameter value. The controller receives the initial and desired geometries; applies the model to the initial geometry and to different input parameter values; based on output geometries of the model, determines a set of parameter values for controlling the robot arm; and controls the robot arm according to the determined set of parameter values to form the part into the desired geometry using the end effector.

20 Claims, 22 Drawing Sheets

Related U.S. Application Data on Jan. 6, 2021, provisional application No. 63/134,576, filed on Jan. 6, 2021.

(51) Int. Cl.
  *B25J 9/00* (2006.01)
  *B25J 13/08* (2006.01)
  *B24B 1/04* (2006.01)
  *B23Q 3/155* (2006.01)

(52) U.S. Cl.
  CPC .......... *B25J 9/1653* (2013.01); *B25J 9/1664* (2013.01); *B25J 9/1682* (2013.01); *B25J 9/1697* (2013.01); *B25J 11/005* (2013.01); *B25J 11/006* (2013.01); *B25J 13/085* (2013.01); *B23Q 2003/155421* (2016.11)

(58) Field of Classification Search
  CPC ...... B25J 11/005; B25J 11/006; B25J 13/085; B25J 15/00; B25J 11/0055; B25J 9/1605; B25J 9/1612; B25J 9/1633; B25J 9/1661; B25J 9/1669; B25J 9/1687; B23Q 3/1554; B23Q 2003/155421; B23Q 15/08; B23Q 17/0919; B23Q 17/0947; B24B 1/04; G05B 19/18; G05B 19/40932; G05B 2219/32215; G05B 2219/35434; G05B 2219/36086; G05B 2219/36283; G05B 2219/36289; G05B 2219/37087; G05B 2219/37437; G05B 2219/49074; G05B 2219/49079; G05B 2219/40421; G05B 2219/40515

See application file for complete search history.

(56) References Cited

U.S. PATENT DOCUMENTS

| | | | |
|---|---|---|---|
| 2010/0257910 A1* | 10/2010 | Castle | B21D 22/02 72/57 |
| 2014/0081461 A1 | 3/2014 | Williamson et al. | |
| 2014/0088746 A1* | 3/2014 | Maloney | G05B 19/4099 700/97 |
| 2015/0051726 A1 | 2/2015 | Euhus | |
| 2017/0348854 A1 | 12/2017 | Oleynik | |
| 2018/0341248 A1* | 11/2018 | Mehr | B22F 10/00 |
| 2020/0376666 A1 | 12/2020 | Briquet-Kerestedjian et al. | |
| 2021/0350036 A1* | 11/2021 | Burla | G06F 30/12 |
| 2022/0009217 A1* | 1/2022 | Brockschmidt | F16D 65/16 |
| 2022/0100168 A1* | 3/2022 | Noirot-Nerin | G05B 19/18 |

OTHER PUBLICATIONS

PCT International Search Report and Written Opinion, PCT Application No. PCT/US2022/011476, dated Jun. 9, 2022, 15 pages.

PCT Invitation to Pay Additional Fees, PCT Application No. PCT/US2022/011476, dated Mar. 15, 2022, 2 pages.

\* cited by examiner

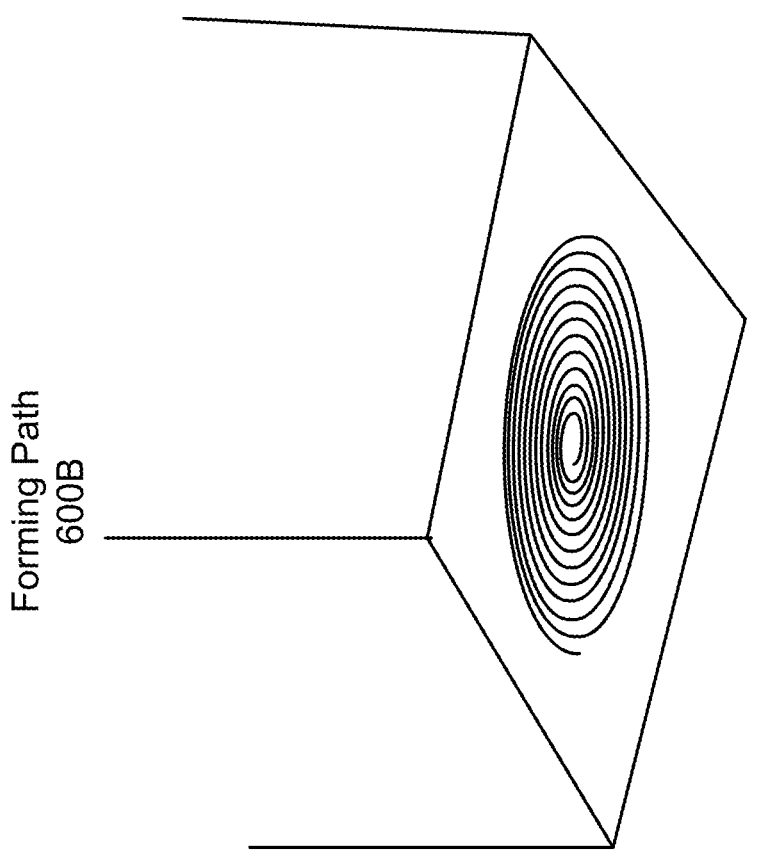
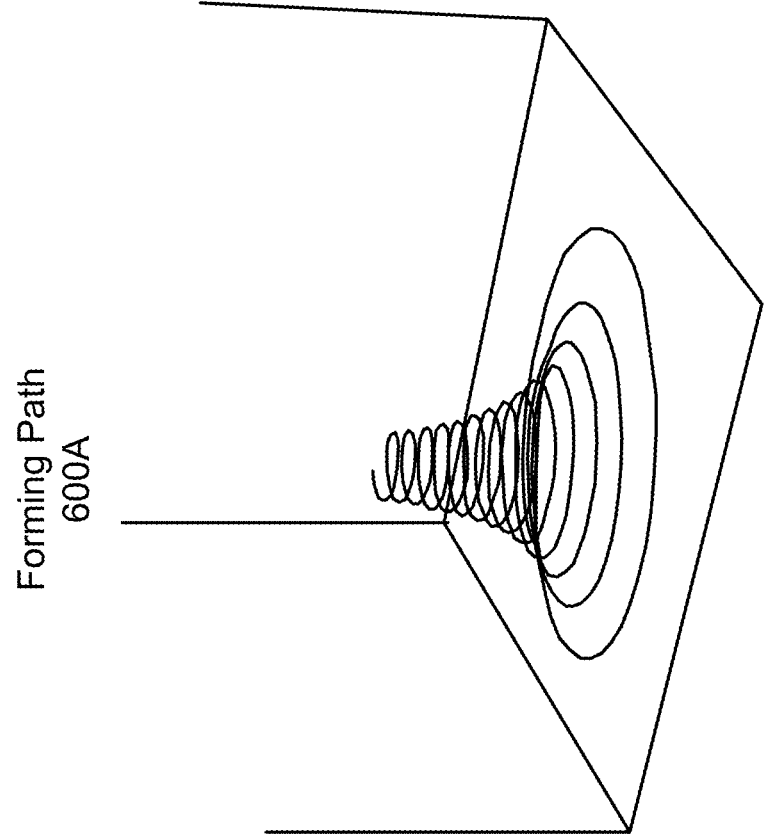
FIG. 6

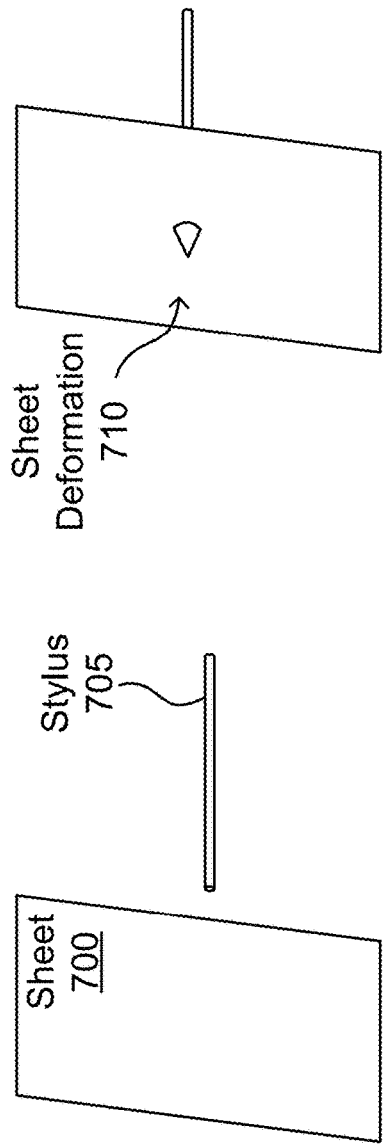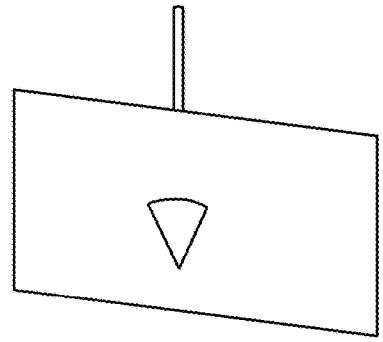

Part Formed Using Two Robot Arms 1515
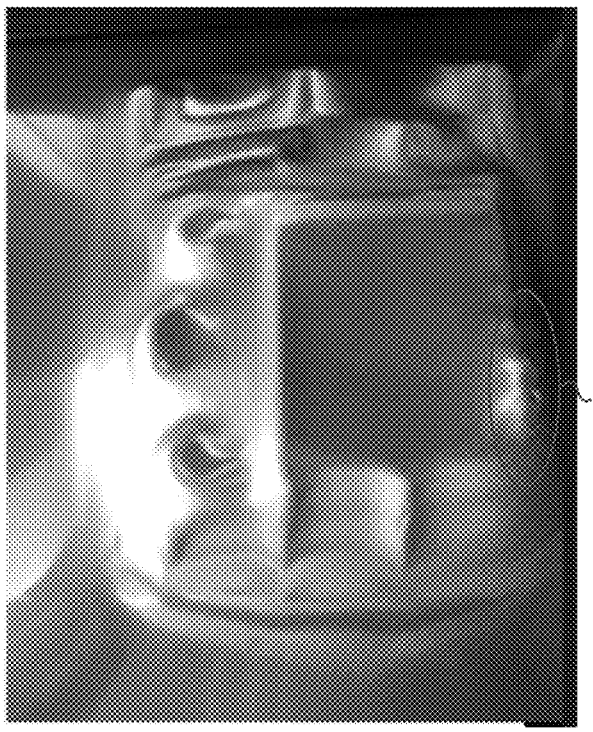
Part Formed Using Single Robot Arm 1510
Tear 1520
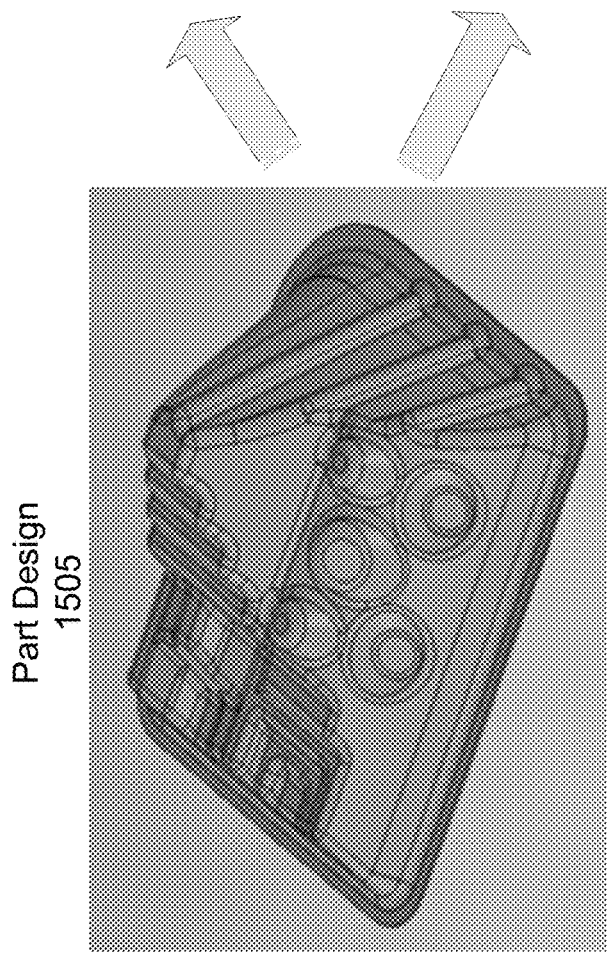
Part Design 1505
FIG. 15

PART FORMING USING INTELLIGENT ROBOTIC SYSTEM

CROSS-REFERENCE TO RELATED APPLICATION

This application claims priority under 35 U.S.C. § 119(e) to U.S. Provisional Patent Application Ser. No. 63/134,571, "Method of Intelligent Robotic Sheet Forming," filed Jan. 6, 2021, U.S. Provisional Patent Application Ser. No. 63/134,572, "Systems for Fast Robotic Sheet Metal Forming," filed Jan. 6, 2021, and U.S. Provisional Patent Application Ser. No. 63/134,576 "System for Surgical Precipitation Hardening of Alloys Using Ultrasonic at Room Temperature," filed Jan. 6, 2021. The subject matter of all of the foregoing is incorporated herein by reference in their entirety.

TECHNICAL FIELD

This disclosure relates generally to robotic sheet forming, and more particularly, to forming a sheet of material into a desired geometry by a series of deformations applied by a robot.

BACKGROUND

Description of Related Art

Sheet metal parts are used in a multitude of applications and across many different industries (e.g., in aerospace, automotive, biomedical, and consumer electronics industries). Sheet metal part forming is the manufacturing process through which sheet metal parts are made. However, sheet metal part forming is very tool intensive, which makes it costly and time consuming to fabricate sheet metal parts. A method for sheet metal part forming is stamping. In stamping, a series of female and male dies that are specific to each design and material are fabricated (tooling). A sheet metal part is formed in a press machine by sandwiching sheet metal between the two dies with force. Stamping requires a large investment in dies and is not accommodating to changes in design and material, making the sheet metal forming process expensive and time-consuming.

Furthermore, the ability to cheaply manufacture sheet metal parts with complex geometries may depend on controlling material properties of the sheet metal. Many manufacturing processes such as forming, machining, joining, and additive manufacturing may rely on the existence of certain material properties in the feedstock to repeatedly fabricate parts. For example, the plasticity of virgin sheet metal affects its formability for a stamping process. Additionally, a manufacturing process may affect the material properties of the final part and material property manipulation may be included in a post-processing step. For example, a manufactured gear requires an extra processing step to harden its teeth.

One of the mechanisms of hardening common alloys is precipitation strengthening. Precipitation strengthening may be done using a heat treatment process in which an alloy is held at elevated temperatures for a certain time period, depending on the alloy and the required hardening effect. For example, aluminum alloys may be elevated to 500° C. and steel alloys may be elevated to 1000° C. However, using high temperatures has environmental side effects such as a high energy footprint and, depending on the method used, results in pollutant emissions. From an industrial perspective, an alloy's exposure to high temperatures can result in defects such as distortion, warpage, oxidation, etc. It also makes handling of the material and parts harder and creates hazardous conditions for the human operators of the process. Furthermore, heat treatment is usually done using furnaces that lack precise control to selectively treat different sections of the part.

SUMMARY

Robotic sheet part forming is a sheet metal part forming technique where a sheet is formed into a desired geometry by a series of incremental deformations applied by a robot. For example, the robot is outfitted with a stiff stylus that delivers deformations to the sheet. The robot may change tools to apply different operations (e.g., trimming and hemming) to the metal part. Multiple robots may be used in the process to provide more accurate control of the process.

Some embodiments relate to a system for forming a part in an initial geometry (e.g., a sheet) into a desired geometry. The system includes a robot arm with an end effector, a model and a controller. The model receives an input geometry and an input parameter value indicating an interaction between the part and the end effector. The model determines an output geometry of the part based on the input geometry and the input parameter value. The controller (i) receives the initial and desired geometries; (ii) applies the model to the initial geometry and to different input parameter values; based on output geometries of the model; (iii) determines a set of parameter values for controlling the robot arm; and (iv) controls the robot arm according to the determined set of parameter values to form the part into the desired geometry using the end effector. Note that the roman numerals used above are for reference purposes. The roman numerals are not intended to limit the steps to a specific sequential ordering.

In some embodiments, the system further includes a second robot arm with a second end effector. The second robot arm is located on an opposite side of the part relative to the robot arm. The controller is further configured to control the second robot arm in conjunction with the robot arm to form the part into the desired geometry. The model may be configured to determine the output geometry of the part based on the input geometry, the input parameter, and a second input parameter that indicates an interaction between the part and the second end effector.

In some embodiments, the end effector includes a stylus configured to deform the part to form the desired geometry. The input parameter may indicate the stylus exerting a force on a portion of the part.

In some embodiments, the model is a machine learned model. The model may be trained using at least one of: data generated by a physics simulator; data generated by sensors on the robot arm or another robot arm; or data generated from scanning another part that was previously formed from a first geometry into a second geometry different than the first geometry.

In some embodiments, the input parameter value includes: a path of the end effector, a speed of the end effector, a geometry of the end effector, an amount of force exerted by the end effector onto the part, an angle of the end effector, or a position of the end effector. In some embodiments, the model receives multiple input parameter values.

In some embodiments, receiving the initial geometry of the part includes: receiving sensor data from a sensor mounted to the robot arm; and determining the initial geometry based on sensor data. The sensor may be a surface scanner. The sensor may be a load sensor, and the sensor data may indicate a previous interaction between the part and the end effector.

In some embodiments, the controller is further configured to: receive sensor data from a sensor mounted to the robot arm; determine a current geometry of the part based on the sensor data; receive a second desired geometry different than the current geometry; define the current geometry as the initial geometry and define the second desired geometry as the desired geometry; and repeat steps (i)-(iv).

In some embodiments, the desired geometry is predetermined using the model and an optimization process.

In some embodiments, the different input parameters are determined using the model and an optimization process.

In some embodiments, to apply the model to the initial geometry and to the different input parameter values, the controller is further configured to: apply the model to an initial parameter value; receive an output geometry determined by the model based on the initial parameter value; compare the output geometry with the desired geometry; and determine an updated parameter value based on the comparison.

In some embodiments, to determine the set of one or more parameter values, the controller is further configured to: compare the output geometries of the model with the desired geometry; and determine the set of one or more parameter values based on the comparison.

Some embodiments relate to a system that includes a frame holding a part, a robot arm adjacent to the frame, a tool rack with a plurality of tools that are interchangeable, and a controller. The controller controls the robotic arm to automatically attach a forming tool from the tool rack to the tool holder; controls the robotic arm with the forming tool to form the part in a first geometry (e.g., a sheet) into a second geometry; and controls the robotic arm to automatically return the forming tool to the tool rack and detach the forming tool from the tool holder.

In some embodiments, the program code further includes code that when executed causes the controller to: control the robotic arm to automatically attach a trimming tool from the tool rack to the tool holder; control the robotic arm with the trimming tool to trim the part in the second geometry into a trimmed part; and control the robotic arm to automatically return the trimming tool to the tool rack and detach the trimming tool from the tool holder. The trimming tool may include at least one of: a spindle, a laser, or a plasma torch.

In some embodiments, the program code further includes code that when executed causes the controller to: control the robotic arm to automatically attach a hemming tool from the tool rack to the tool holder; control the robotic arm with the hemming tool to hem the part in the second geometry into a hemmed part; and control the robotic arm to automatically return the hemming tool to the tool rack and detach the hemming tool from the tool holder.

In some embodiments, the system further includes: a second robotic arm positioned adjacent to the frame on an opposite side from the robotic arm. The controller is configured to control the second robotic arm according to a second program code that causes the controller to: control the second robotic arm to interact with the part concurrently with the robotic arm to form the part in the first geometry into the second geometry.

In some embodiments, the forming tool includes a stylus.

In some embodiments, the forming tool includes a roller tool. The roller tool includes a roller configured to rotate about a first axis. Controlling the robotic arm with the forming tool may include: moving the roller tool across a surface of the part along a direction, and orienting the roller tool so the roller rotates about the first axis and along the direction. In some embodiments, the roller tool includes a roller configured to rotate about a second axis perpendicular to the first axis. In these embodiments, the roller tool may include a ball in a socket.

In some embodiments, the part in the first geometry is a piece of sheet metal.

In some embodiments, the robot arm comprises a six degree-of-freedom actuator system configured to control motion of the robotic arm through three-dimensional space.

Some embodiments relate to a system for treating a (e.g., sheet metal) part with ultrasonic vibrations. The system includes a robotic arm, an ultrasonic end effector, and a controller. The robotic arm includes an actuator system that controls motion of the robotic arm and a tool holder. The ultrasonic end effector is configured to apply ultrasonic vibrations to a region of the part. The controller executes a program for controlling motion of the robotic arm for the ultrasonic end effector to apply ultrasonic vibrations to the region of the part; and controls the ultrasonic vibrations of the ultrasonic end effector based on a programmed ultrasonic parameter value for the region.

In some embodiments, the system further includes sensors configured to sense properties of at least one of: the robotic arm, the ultrasonic end-effector, or the region of the part (e.g., vibrations at the region or the temperature of the region). The controller may be further configured to adapt the motion of the robotic arm or vibrations of the ultrasonic end-effector based on the sensed properties.

In some embodiments, the programmed ultrasonic parameter for the region is based on a material property of the region and a desired treatment for the region.

In some embodiments, the programmed ultrasonic parameter value is determined so the ultrasonic vibrations soften material at the region.

In some embodiments, the programmed ultrasonic parameter value is determined so the ultrasonic vibrations harden material at the region.

In some embodiments, the ultrasonic end effector includes a mechanical transducer coupled to a component with a surface configured to interact with the part or a material of the part. For example, the component includes a rounded surface.

In some embodiments, the surface area of the region is less than the surface area of the part.

In some embodiments, when the ultrasonic end effector applies ultrasonic vibrations to the part, the ultrasonic end effector does not apply vibrations to other regions of the part.

In some embodiments, the ultrasonic vibrations change the temperature of the region by less than ten degrees Celsius.

In some embodiments, the ultrasonic parameter value indicates at least one of: a power of the ultrasonic vibrations, a frequency of the ultrasonic vibrations, a speed of the motion of the robotic arm, or an angle of the ultrasonic end effector (e.g., relative to a surface of the part a segment of the robot arm, or a ground surface in the external environment).

In some embodiments, wherein controlling motion of the robotic arm includes controlling the end effector to move on a path along a surface of the part.

In some embodiments, the actuator system is a six degree-of-freedom actuator system configured to control motion of the robotic arm through three-dimensional space.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 6 includes plots of different forming paths to form a cone, according to an embodiment.

FIGS. 7A-7D illustrate a forming process, according to an embodiment.

FIG. 15 includes images of two different parts made using a same part design and different forming techniques, according to an embodiment.

DETAILED DESCRIPTION

1. Robotic Sheet Metal Part Forming

Increasing the speed and decreasing the cost to manufacture sheet metal parts is desirable for enhancing product development in all stages of design and manufacturing. In light of this, some embodiments relate to an intelligent machine learning-based system that automates object process parameter generation for real-time control of novel robotic forming of sheet metal, plastics, polymers, and composite parts. Relative to conventional techniques, the disclosed (e.g., fast forming) techniques may enable faster prototyping and may enable rapid customization of mass-produced products. Agile production or prototyping in turn enables development of better-quality products and streamlining production. It may also increase industrial competitiveness in both mature and emerging markets by reducing the time and capital used for developing new components. The benefits may extend further for "lightweighting" strategies employed in various industries (e.g., aerospace and automotive) that want to move towards lighter and higher strength alloys but are slowed down by testing of these alloys. For simplicity, the below descriptions refer to forming parts from sheet metal. However, as indicated above, embodiments described herein may be applicable to forming parts from other materials, such as plastics, polymers, and composites.

Robotic sheet metal part forming overcomes the restrictions of the traditional methods by reducing or removing fabrication of tooling and dies from the production process. Robotic sheet part forming is a sheet metal part forming technique where a sheet is formed into a desired geometry by a series of (e.g. small) incremental deformations applied by a robot. For example, the robot is outfitted with a stiff stylus that delivers deformations to the sheet. Multiple robots may be used in the process to provide more accurate control of the deformations.

Figure 1:
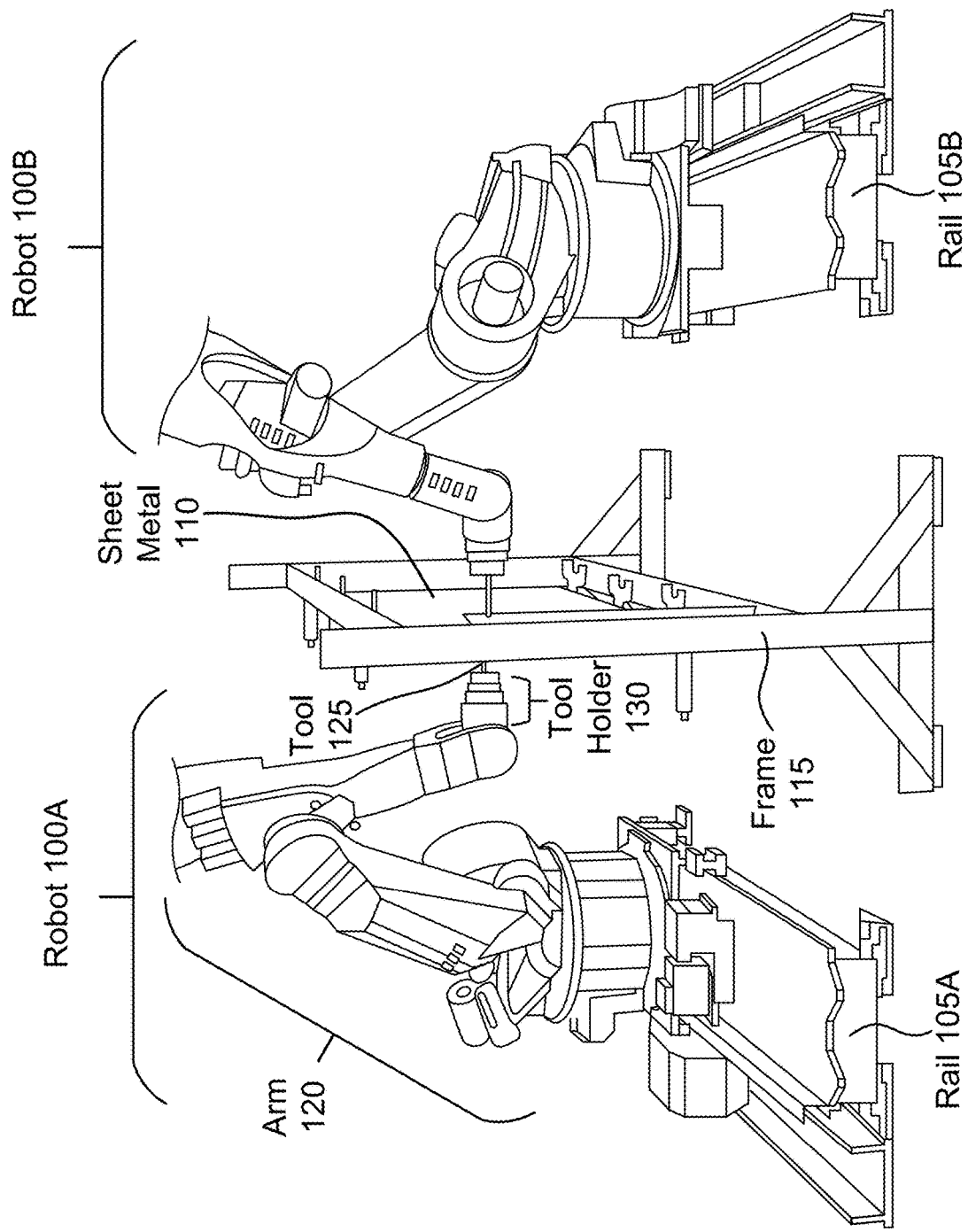
FIG. 1 is a perspective view of a robotic setup for part forming, according to an embodiment.

FIG. 1 illustrates an example embodiment of a setup for robotic sheet metal part forming. Two robots 100A and 100B face each other on respective rails 105A and 105B on opposite sides of the sheet metal 110. The sheet metal is supported by a frame 115 (also referred to as a fixture). Specifically, edges of the sheet metal are coupled (e.g., clamped) to the frame to hold the sheet metal in place. The sheet metal is fixed between the two robots to allow easy access from both robots to opposite sides of the sheet. The robots may be high payload industrial robotic arms that can exert forces sufficient to deform the sheet metal (e.g., up to 20,000 N). The amount of force exerted may depend on the material strength and thickness of the sheet. For example, for 2 mm 5xxx aluminum (including aluminum alloys), the peak forces may be 2,000N. In another example, for high strength martensitic steel, the peak forces may be 20,000N. The amount of force may also depend on process parameters. For example, there may be a tradeoff between time duration and force (e.g., a 1 mm stainless steel part takes 4 hours to form with a peak force of 4,000N but it takes 8 hours to form if the peak force is 3,000N). The robots may comprise an articulated 6-axis robotic arm (e.g., arm 120) capable of moving a tool (e.g., tool 125) (also referred to as an end effector) attached to the end of the arm in a three-dimensional space according to 6 degree of freedom motion. The arm may include an actuator system configured to move the robot in space. For example, each segment of the robot arm includes an actuator to move it relative to another arm segment. The end of the robot arm includes a tool holder (e.g., tool holder 130) that enables one or more selectable types of tools to be attached. The tools can include, for example, a hard stylus having ends of varying diameters, shapes, or materials, a roller tool as described below, a spindle tool, a laser tool, a plasma torch, a cutting tool, or a hole making tool. The robots are also slidable along the rails to enable the robots to operate over a wide range of sheet metal sizes and sizes of the part being fabricated. For example, the part can be as small as a few cubic inches or as big as a few cubic feet (in the volume it occupies). The robot's arms may be controlled by a controller (e.g., an external computation system) that takes into account the geometry of the final part and signals from one or more various sensors installed on the robot. The sensors may include, for example, accelerometers, gyroscopes, pressure sensors, or other sensors for detecting motion, position, and interactions of the robot with the sheet metal.

The use of two robots (one on each side of the sheet) may provide several advantages. For example, if only a single robot is used, the sheet may globally deform (instead of locally deform). Thus, using two robots may enable localized deformations. A second robot (also referred to as a support robot) may reduce or prevent tearing of the part by providing supporting pressure on the opposite side of the part. The location of the robots (and their end effectors) with respect to each other may be based on the design of the part and the material and thickness of the sheet. These locations may be determined by a model (described further below). An example of the advantages of two robots is illustrated in FIG. 15. FIG. 15 includes a part design 1505 that illustrates the design of a part to be formed. The images on the right illustrate parts formed based on the design 1505. The bottom right image illustrates a part 1510 formed using only one robot and the top right image illustrates a part 1515 formed using two robots. As illustrated, part 1515 includes more details and more closely resembles the part in 1505. Additionally, the part 1501 includes a tear 1520.

A controller may receive and process sensor data from the sensors to determine the proper parameters (e.g., joint angle values for each joint of the robotic arm) and control the robot arms accordingly. In some embodiments, the robots are controlled to pinch or otherwise apply pressure to the sheet metal with a hard implement (e.g., a stylus) or other tool to form the sheet of metal in accordance with a program applied by the controller to result in a desired geometry. For example, the program controls the robot arms to move in a particular sequence and apply the tool to the sheet metal according to particular programmed parameters at each step (e.g., time step) of the sequence to achieve a programmed geometry. The program (via the robotic arms) may cause the different applied tools to bend, pinch, cut, heat, seam, or otherwise form the metal in accordance with the program.

An example part forming process is illustrated in FIGS. 7A-7D. The FIGS. include a sheet 700 and a stylus 705 (e.g., coupled to a robot arm). In FIG. 7B the stylus is applied to the sheet. The result is a deformation 710. FIGS. 7C and 7D illustrate larger deformations that result from the stylus being applied to different locations on the sheet (e.g., in a spiral pattern). To facilitate the deformation into a desired geometry (e.g., a cone), a second tool (e.g., coupled to a second robot arm) may be applied to the opposite surface of the sheet.

2. Controller and Model

The controller determines the process parameters to achieve the desired robotic forming operations. Parameters such as the path of the robotic forming tool during the process, its speed, geometry of the forming tool, amount of force, angle and direction of the forming tool, clamping forces of the sheet, etc. may have direct but nonlinear effects on the final geometry. The part forming process may include a set of time steps, where each step describes parameters values for one or more parameters. The part forming process may be iterative. Thus, by executing the system according to the parameter values at each time step, the controller may form the part described in the input design. The parameters values may be determined by the model.

The disclosed robotic system may achieve real-time adaptive control of a part forming process. The method may start with an input design of a part and a (e.g., statistical) model that is generated using a training data set. The training data set may include data from simulation data, and physical process characterization data (such as an in-process inspection or post-build inspection from previously formed parts or geometries). An in-process inspection may include inspecting a part during the forming process. For example, a scanning sensor records the shape of the part as it is being formed. In another example, an eddy current sensor detects defects like cracks. In another example, a force sensor measures the forces applied to the part. A post-build inspection is intended to gather information on a fully formed part. A post-build inspection may include similar inspection techniques as an in-process inspection (e.g., inspecting a part using a scanning sensor or eddy current sensor). However, a post-build inspection may include inspection techniques not performed while the part is being formed (e.g., due to practicality). For example, a fully formed part may be inspected using an x-ray machine.

Figure 2A:
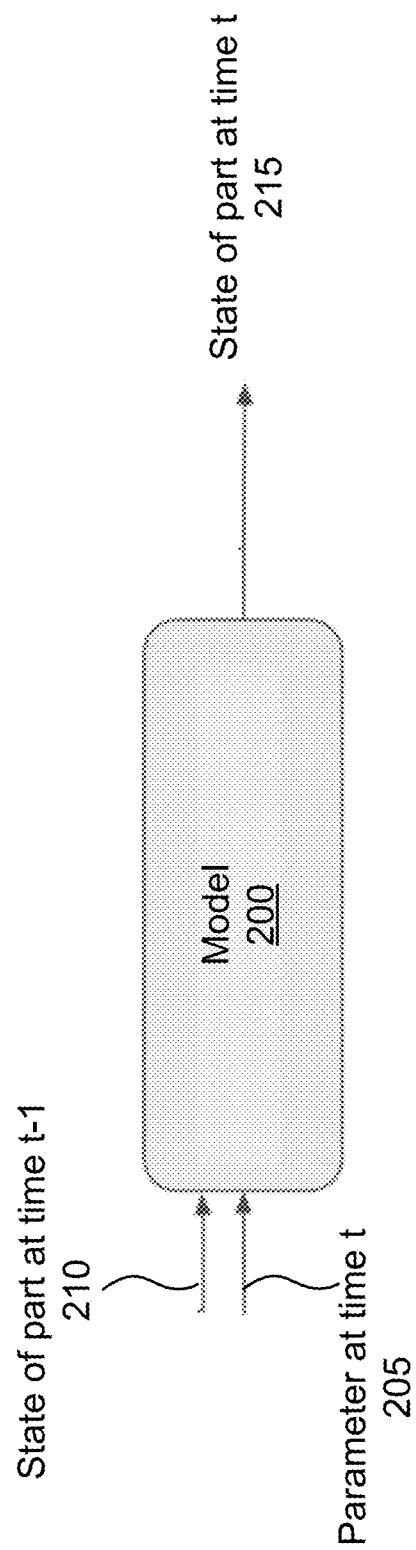
FIG. 2A is block diagram of a model, according to an embodiment.

FIG. 2A is a block diagram of an example model 200. As indicated above, the model may be a machine learned statistical model. The model receives one or more parameters 205 to be applied at time step t and the state 210 of the part at time step t-1. The state may refer to the geometry of the part. The model outputs the state 215 of the part at time step t. Thus, for a given state, the model can predict how the part will respond to the application of various parameters. More generally, the model may be used to predict how a material will deform when it goes through a programmed forming process (e.g., over multiple time steps)

A state of the part may be described by a mesh. The mesh may be a graph of coupled nodes, where each node represents a physical point of the part metal. Each node may be described by the following variables: X, Y, Z, F1z, F1x, F1y, F2z, F2x, F2y, thickness, dx, dy, and dz. X, Y, and Z represent the location of the node in space. Thickness indicates the sheet thickness at that node. Each node may be coupled to neighboring nodes (e.g., three neighbors). These coupled nodes represent the part in cartesian space. F1z, F1x, and F1y represent the force that one of the robots (e.g., robot 1) is applying at that node, and F2z, F2x, F2y represent the force another robot (e.g., robot 2) is applying at that node. dx, dy, and dz represent the size of movements capable at a node if the robots pull back from the part at this time (e.g., they capture the elastic strain of the material).

The model can be used to determine the process parameters (e.g., in real time or offline). This method automates the generation of parameters for the robotic forming process (further described in the next paragraph). Due to the optimization process, the generated parameters may not be conceivable by engineers.

After the model is determined (e.g., by a training process), optimization techniques may be used to determine parameters to apply at each (e.g., time) step of the part forming process to create the intended part geometry. For example, for a given time step, the model is applied to various input parameter values according to an optimization technique to determine which parameter values will result in a desired geometry (or a geometry close to the desired geometry). Multiple optimization techniques may be used. Example optimization techniques include gradient descent, Adam optimization, and Bayesian optimization. An optimization technique may be chosen based on the complexity of the desired geometry. The optimization may be done both in the long and short horizons (e.g., time scales). The long horizon optimization may be done offline (before the part forming process begins) to determine steps of the process (e.g., step by step instructions for the robot to achieve the desired geometry). For example, a long horizon optimization may determine how to form a material sheet into a fully formed part. In some embodiments, long horizon optimizations determine a set of intermediate geometries that occur during a part forming process (e.g., intermediate geometries between the sheet and the fully formed part (e.g., for each time step or layer)). However, errors or inaccuracies may accrue over time (e.g., for processes with lengthy build times or processes with a large number of time steps). For example, the part may deform differently than the model predicted. To remedy this issue, short horizon optimizations may be performed during the forming process (online) to reduce or correct errors that may accrue. For example, the model is queried by a (e.g., online) controller that can modify (e.g., correct) steps determined during the long horizon optimization based on the current state of the sheet. For example, for a given time step, instead of assuming the part has a geometry predicted by the long horizon optimization, sensor data may be used to determine the actual geometry of the part. The model may then be queried to determine a new set of parameter values for the time step (or modify the long horizon parameters associated with the time step). For example, the model may be queried to determine which parameter values will form the actual geometry into the predicted geometry (or another intermediate geometry from the long horizon optimization).

While long horizon optimizations may be used to determine an entire part forming process or significant portions of the process, determinations made by short horizon optimizations may be limited to small portions of the part forming process. For example, a short horizon optimization determines a number of interactions (e.g., less than ten) between the end effector and the part. In another example, a short horizon optimization determines interactions between the end effector and the part that will occur during a time window (e.g., less than ten seconds). In another example, a short horizon optimization determines parameter values for a set of time steps (e.g., less than ten time steps). In another example, a short horizon optimization determines how to form a part in a first geometry into a second geometry, where the first and second geometries are intermediate geometries determined by a long horizon optimization. In another example, a short horizon optimization is used to determine how to form a part so that it is a threshold percent closer to a final geometry (e.g., less than ten percent).

In some embodiments, a long horizon optimization is used without short horizon optimizations (e.g., the model has a threshold accuracy or the part forming process has a short build time or a small number of time steps). In some embodiments, short horizon optimizations are used without a long horizon optimization.

Referring back to the model 200, the model may be trained using the data from a simulation module. Additionally, or alternatively, the model 200 may be trained using data (e.g., sensor data) from a physical process that forms a part.

In some embodiments, multiple models are trained. For example, models may be trained using different machine learning techniques. Additionally, or alternatively, models may be trained for specific materials (e.g., steel vs. aluminum), geometries (simple vs. complex), or sheet thickness (e.g., 1 mm vs. 2 mm). Among other advantages, models trained for specific specifications may be more accurate than a general model.

Figure 2B:
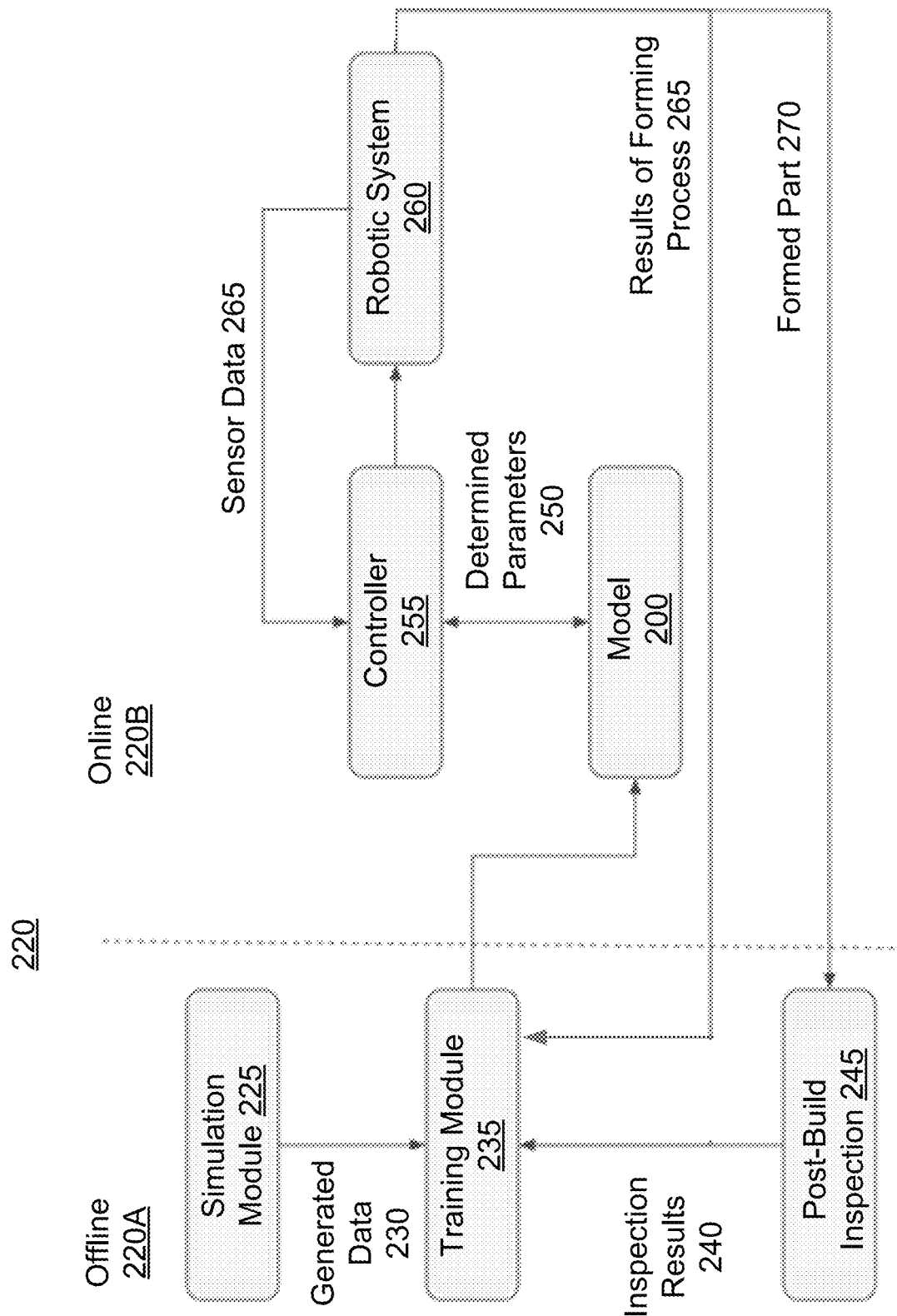
FIG. 2B is a block diagram of a part forming process, according to an embodiment.

FIG. 2B is a block diagram illustrating an example of the process 220. The process includes an offline learning process 220A and online process 220B. In this context, "online" refers to a time period when a part forming process is occurring (e.g., a robot is deforming a metal sheet to form a part), and "offline" refers to a time before or after a part forming process. The offline process uses simulation data 230, data 265 generated by an in-process inspection, and data 240 generated by a post-build inspection (of the formed part 270) to train model 200. Example data from an in-process inspection is metrology data. Example data post-build inspections includes geometry scans or X-rays of the finished part. After the model 200 is generated, it may be used to determine a part forming process.

The model 200 may also be applied by the controller 255 of the robotic system 260 in the online process. More specifically, the model 200 may determine predictions about the resulting change in geometry from each parameter change at each point in time in the part forming process. In the online process, the controller uses sensors installed on the robotic forming system to obtain sensor data 265 to determine a current geometry of the part. The current geometry may then be input to the model 200. The model predicts the outcome (e.g., a resulting change in geometry) of changes in those process parameters. By iterating over different possible parameters and their outcome predicted by the model, the controller identifies and chooses the (e.g., best) parameter 250 that produces the most desirable outcome to control the robotic forming system through a forming process that achieves the desired geometry. The controller uses the best parameters and may repeats this optimization cycle (e.g., in every step of the process) to improve the outcome.

In addition to the model 200 described above with respect to FIG. 2A, other models are possible. Two examples are provided below.

2.1 Blackbox Model

Figure 16A:
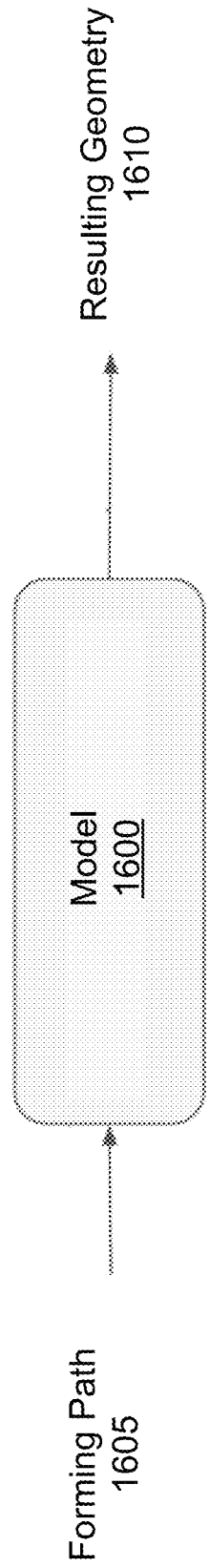
FIGS. 16A-16B are block diagrams of other models, according to some embodiments.

FIG. 16A illustrates an example black box model 1600. The model receives an entire forming path 1605 to be applied to a material sheet and outputs the resulting final geometry 1610 formed by the path. Thus, the model may be trained using data that describes various forming paths and the resulting part geometries. Since the model is not trained to account for physical phenomena (e.g., elastic deformation, global deformation, buckling) the model may be trained using large amounts of training data.

A more complex model is the one that breaks the forming process into layers and tries to predict the effect of various parameter values at each layer. In this context, "layer" refers to a section of a part. For example, a first layer refers to the section that extends one inch away from the original sheet and a second layer refers to the section that extends from the first inch to the second inch. An example of a layer based model is further described below.

2.2 Layer Based Model

Figure 16B:
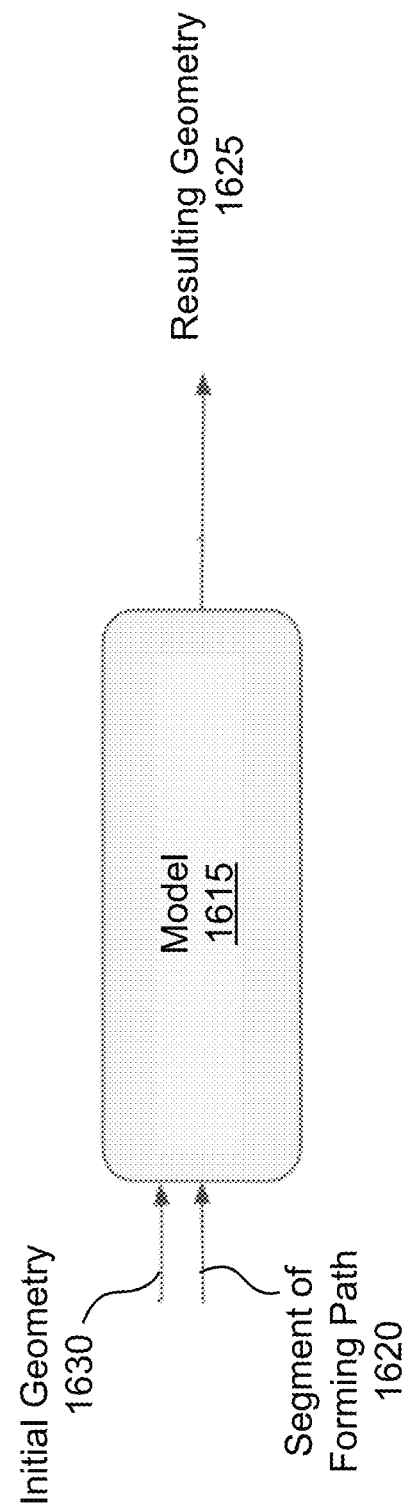

FIG. 16B illustrates an example layer based model 1615. For input, the model receives a segment of a forming path 1620 and the initial geometry 1630 of a metal part (e.g., a sheet or other geometry). The segment of the forming path 1620 may include enough forming path to form a new layer of the part. The model outputs a resulting geometry 1625 (e.g., the geometry of the part with a new layer). Training data for this model may be generated by determining a forming path (e.g., set of parameter values) that formed a new layer of a part (e.g., scan every layer or every few layers).

Model 1615 may be developed as a sequence model which means it may be any of the sequence architectures (e.g., RNN, LSTM, Transformers). This model has more advantages than model 1600 since it is agnostic to general changes to the policy for forming robots. For example, model 1615 may be used to model inset adding or doing ADSIF or grouped DSIF. That being said, in some embodiments, model 1615 does not capture physical phenomena that may occur during each layer or group of layers.

3. Simulation

Referring back to FIG. 2B, the simulation module 225 simulates interaction of a robot-controlled tool, such as a stylus, with a sheet metal or other material. In one example, the simulation may be done using a finite element method. The simulation may be performed to generate simulation data indicating various input parameter values and resulting part geometries. The simulation may be replicated (e.g., in computer data centers) to generate large amounts of simulation data 230. The simulation speed and rate of data generation can be significantly enhanced using GPUs. The large amounts of data may be beneficial for training the model (e.g., instead of only relying on data generated from using a robot arm to physically deform a sheet).

Figure 3:
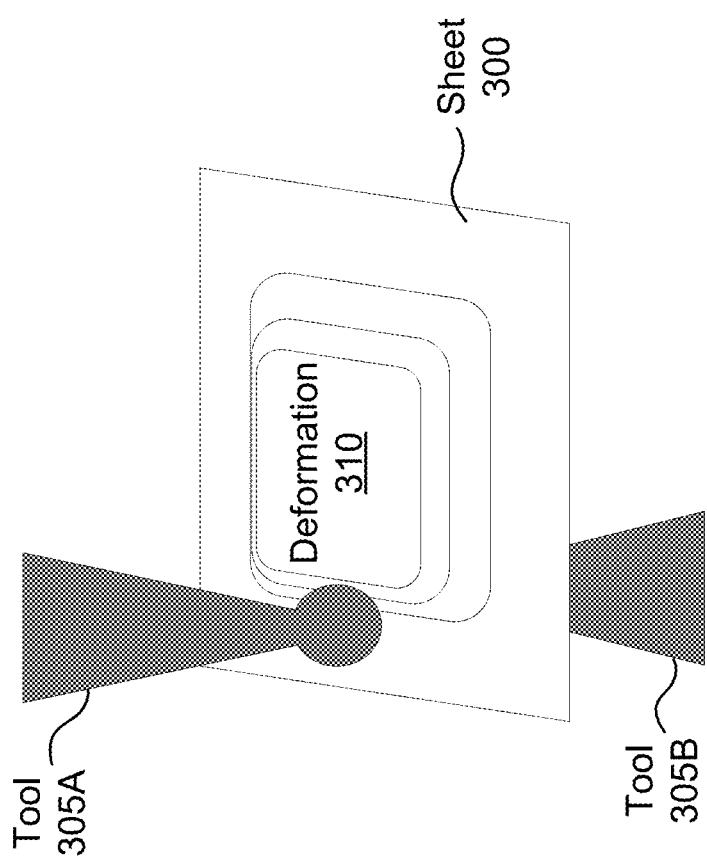
FIG. 3 is an image from a simulated part forming process, according to an embodiment.

FIG. 3 illustrates an example image from a simulation. The image includes a three-dimensional simulation of a sheet 300 and two tools 305A and 305B interacting with the sheet. The tools may be coupled to robot arms. Tool 305A is interacting with the top surface of the sheet, and tool 305B (partially blocked by the sheet) is interacting with the bottom surface of the sheet. The tools are pressing into the sheet to form a deformation 310. In the example of FIG. 3, the deformation is a rectangular hill protruding upward.

Referring back to FIG. 2B, input for the simulation module 225 may be a specification for a sheet, such as its material properties (e.g., the stress-strain curve) and failure criteria (e.g., mechanical failure of the sheet). Failure criteria may be one or more rules that specify when a part has torn or cracked. The criteria may be based on thickness of the sheet, the material properties, and the amount strain put into the sheet. The simulation module may also receive a specification for one or more programmed forming paths (e.g., determined heuristically) and the type and size of the end effector (e.g., stylus). The simulation module outputs, for a sequence of time steps of the programmed control process, the resulting formed geometry.

By varying different input process parameters such as the forming path, its speed, and the geometry being formed, the simulation module 225 can generate a (e.g., large) data set indicating how a specific metal is deformed with this process (e.g., how metal deforms in response to certain input parameters). The simulation data is used to train a model (e.g., by a training module). The model may be trained using one or more different machine learning techniques and constructs, such as Neural Networks, Random Forests, Decision trees, or regressions. in some embodiments, the training techniques are supervised learning techniques.

In some embodiments, the simulation data is used to train an initial model. The initial model may then be refined or retrained using data from physical part forming processes to increase the accuracy of the model.

In the examples described above, the model is generally described in the context of forming operations. However, the model (or another model) may be trained to predict other part operations, such as trimming or hemming.

4. Instrumentation of Robotic Part Forming

The model created using simulation data may be further trained from data derived from an actual physical process that uses a robot arm and an actual sheet. The physical system is equipped with one or more different types of sensors. Example sensors include: (1) encoders in the robot joints that provide positional information as determined by the position of the joints, (2) optical trackers (e.g., a camera) that track the location of robot in (e.g., 3D) space, (3) surface scanners to generate as-built geometry of the part before, during, and after the forming process (surface scanners may have a point accuracy of 0.5 mm), (4) load sensors that determine the force the forming end effectors apply on the sheet, (5) ultrasonic sensors (e.g., electromagnetic acoustic transducer or EMAT) for real-time monitoring of material thickness, and (6) eddy current sensors (e.g., pulsed eddy current) for real-time monitoring of the metallurgical state of metallic sheet. In some embodiments, if the surface scanner is attached to the robot arm, surface scanner data may be stitched together based on the encoder data to determine the geometry of a part (the location of the scanner depends on the position of the arm).

The encoders may be attached to each joint on the robot to track its actual movement, the optical trackers may be mounted around the manufacturing cell. This allows the optical trackers to capture images that include tracking targets installed on the robotic arms and the frame holding the sheet in place. The load sensor and scanner may be attached to the end-of-arm tooling to track forming forces and deformation of the sheet during the process.

Figure 4:
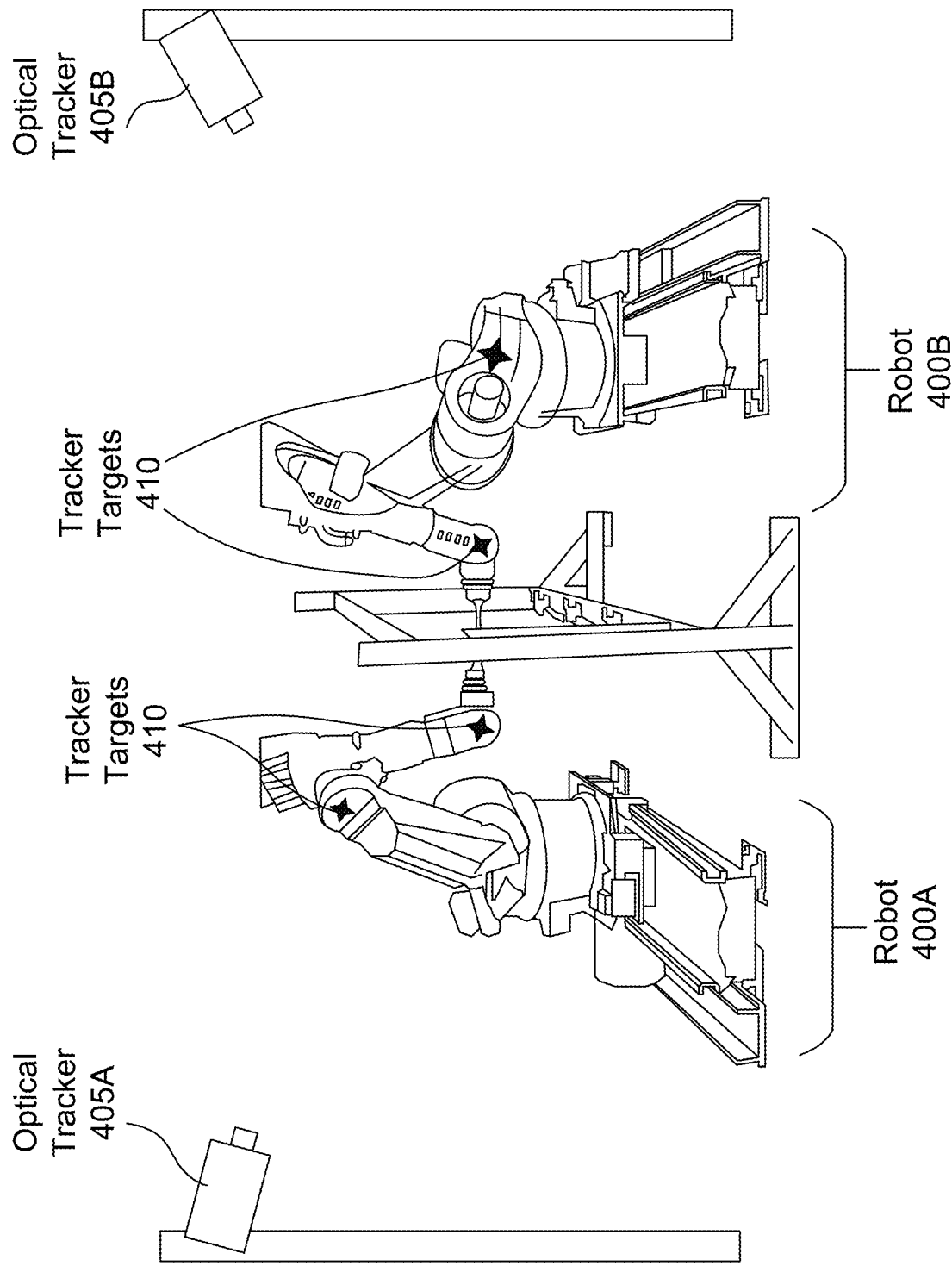
FIG. 4 is a perspective view of a robotic setup with optical trackers, according to an embodiment.

Example optical trackers are illustrated in FIG. 4. FIG. 4 includes two robots 400A and 400B in a manufacturing cell. FIG. 4 also includes two optical trackers 405A and 405B. The robots include tracker targets 410 located at various points on the robots. The optical trackers capture images of the robots and identify the locations of the tracker targets in the images. Thus, the locations of the robots in space can be determined. Although not illustrated, the sheet metal or frame may also include tracking targets to track locations of the robots relative to the metal sheet or frame.

Figure 5A:
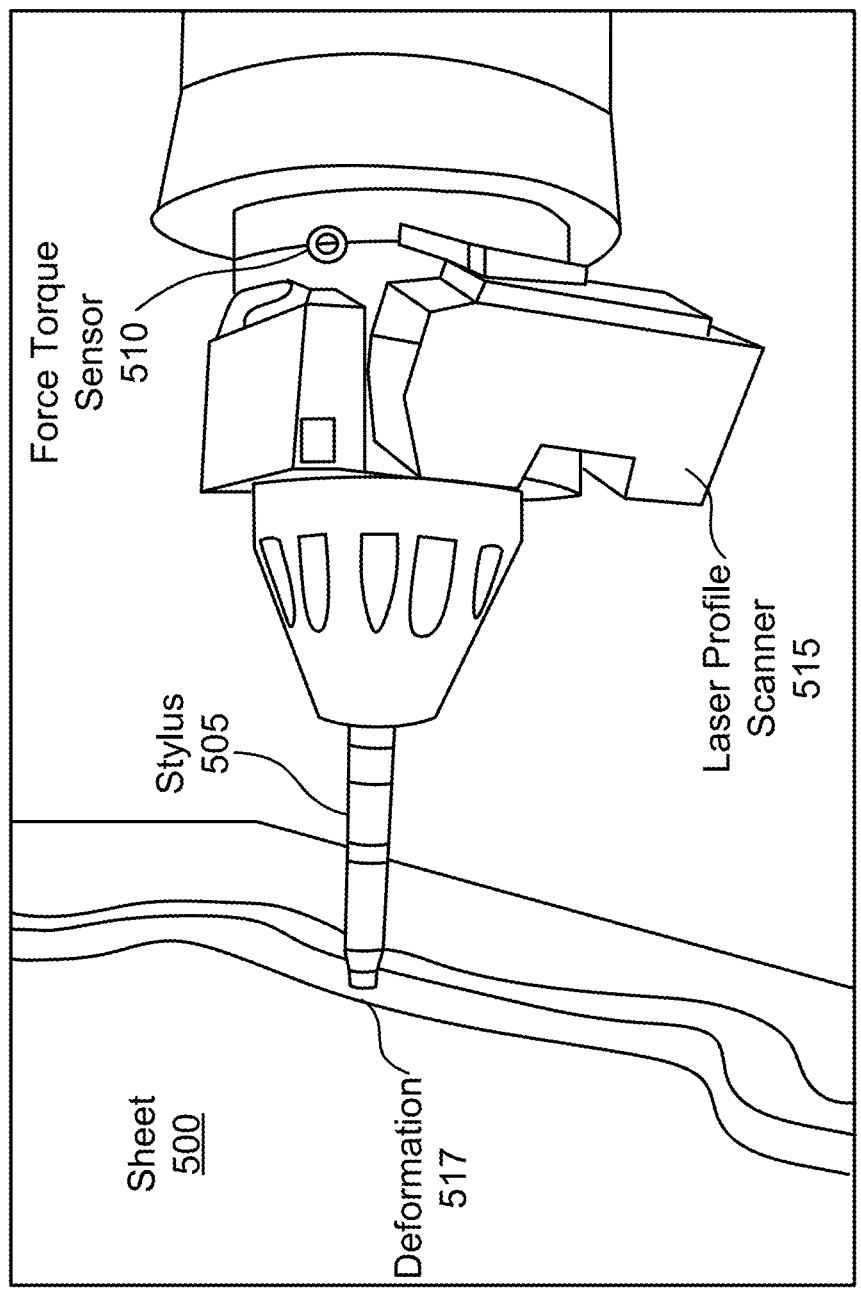
FIG. 5A is a perspective view of a robot arm with a scanner and load sensor, according to an embodiment.
Figure 5B:
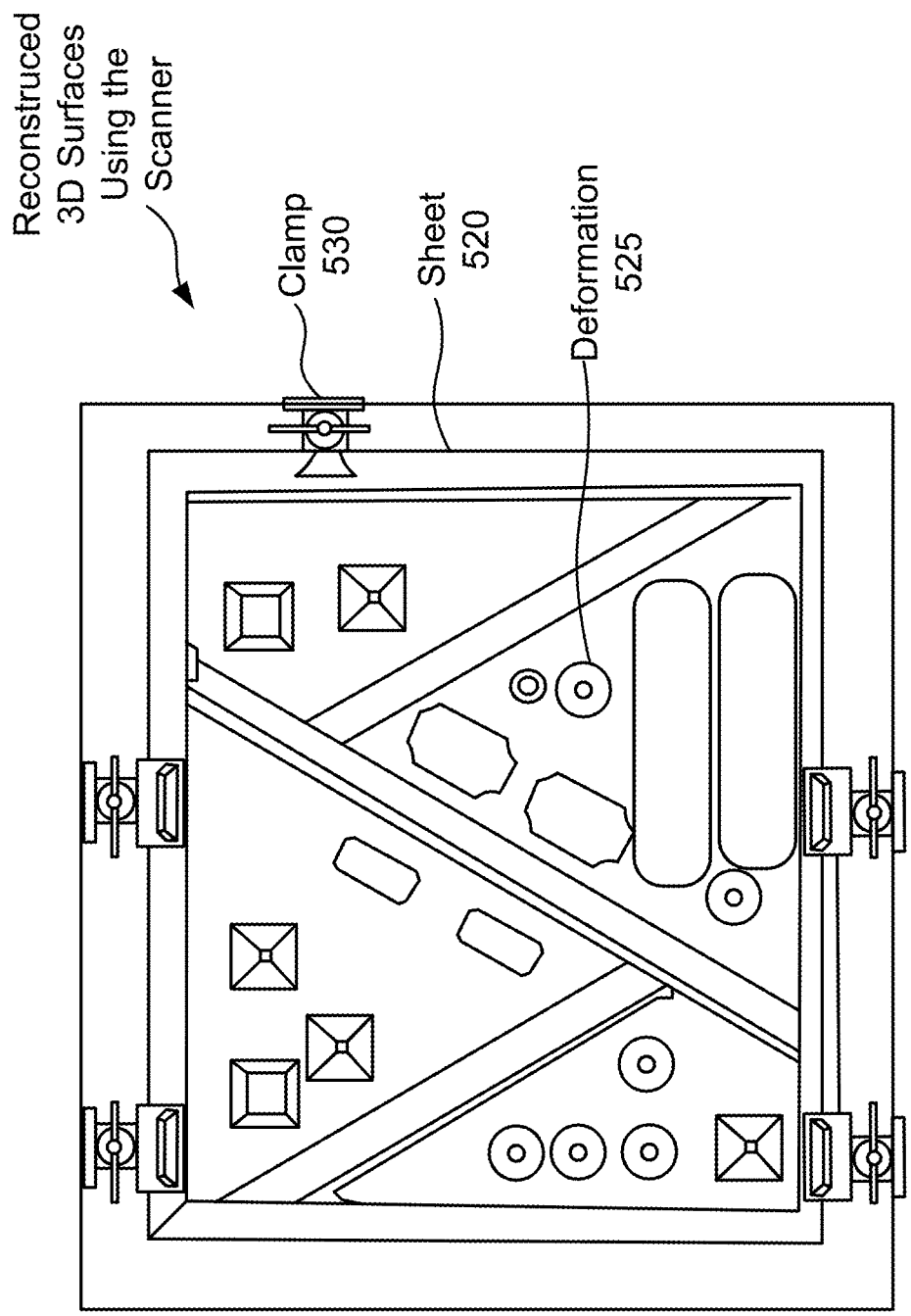
FIG. 5B is an image generated using scanner data, according to an embodiment.

In some embodiments, the robot arm is outfitted with a scanner and a load sensor (e.g., force/torque sensor) as illustrated in FIG. 5A. FIG. 5A illustrates a zoomed in view of an end of a robot arm. The robot arm interacts with a metal sheet 500 via a stylus 505 to create a deformation 517. The arm also includes a force torque sensor 510 and a laser profile scanner 515. FIG. 5B is an example image generated using data from the laser profile scanner 515. FIG. 5B illustrates a reconstructed three-dimensional surface of the metal sheet. The image includes clamps 530, a sheet 520, and deformations 525 in the sheet.

With the sensors described above, accurate data can be captured to characterize steps of a part forming process.

Referring back to FIG. 2B, the training module 235 obtains data 230 generated by the simulation module 225 (e.g., parameters and estimated final geometry of a part for a given forming process), sensor data 265 generated during a part forming process, and data 240 generated during a post-build inspection 245 (e.g., actual final geometry of the part). The training module 235 trains a machine-learned model 200 that maps input parameters to a resulting geometry.

5. Using the Model in Control Loop

Once a process model 200 is generated using the above-described training process, the model may be applied in the control process of the robotic forming in two ways. The model may as an input takes a specification for a sheet, such as its material properties (e.g., stress-strain curve) and failure criteria. It may also receive a specification for forming paths (which may initially be determined offline) and the type and size of the tool. The model can be either queried online for optimized process parameters for each time step of the process in real-time, or it can be used in the design of experiments offline to determine optimal policy for forming the part. The policy here refers to general pathing strategies in forming a part.

FIG. 6 illustrates two different strategies for forming a cone in an example forming process. Both can be evaluated (e.g., by the controller 255) using the machine-learned model 200 to determine a preferred path. The model can also be used (e.g., by the controller 255) to determine a combination of strategies for different locations in the part that might yield the best outcome. On the left side of FIG. 6 is a depiction of a forming path 600A that starts the forming from outside and moves in a circular pattern toward the inside of a cone (first forming the largest radius and then moving toward forming a smaller radii). On the right side of FIG. 6 is depiction of a forming path 600B that starts forming from inside and moves in a circular pattern toward the outside of a cone (first forming the tip of the cone with the smallest radius and then progressively forming larger and larger radii). The model can be used predict the outcome of both strategies to determine the best strategy or their combination for different parts.

Two categories of systems discussed below may increase the speed of sheet metal part fabrication using robots. The first system and design ("Forming With Rollers") increases the speed of the forming process itself, while the second ("Integration of Downstream Processes") addresses downstream processes from part forming to decrease total fabrication time.

6. Forming with Rollers

To increase the speed of the part forming process, an end-effector tool may be configured to interact with the sheet metal with reduced (e.g., low) friction forces. Reducing friction allows for reduction in vibrations in the sheet and hence allows increased speed of forming without negative impact on the geometrical accuracy of the formed part. It may also result in better surface quality (e.g., reduced tearing and galling) compared to tools not configured to reduce friction (e.g., static forming tools).

An example tool configured to reduce friction is a stylus made of a material (or coated with a material) configured to reduce friction. Thus, if the stylus is dragged across the surface of a part, the reduced friction may reduce or eliminate surface degradations and increase the path speed.

Figure 8B:
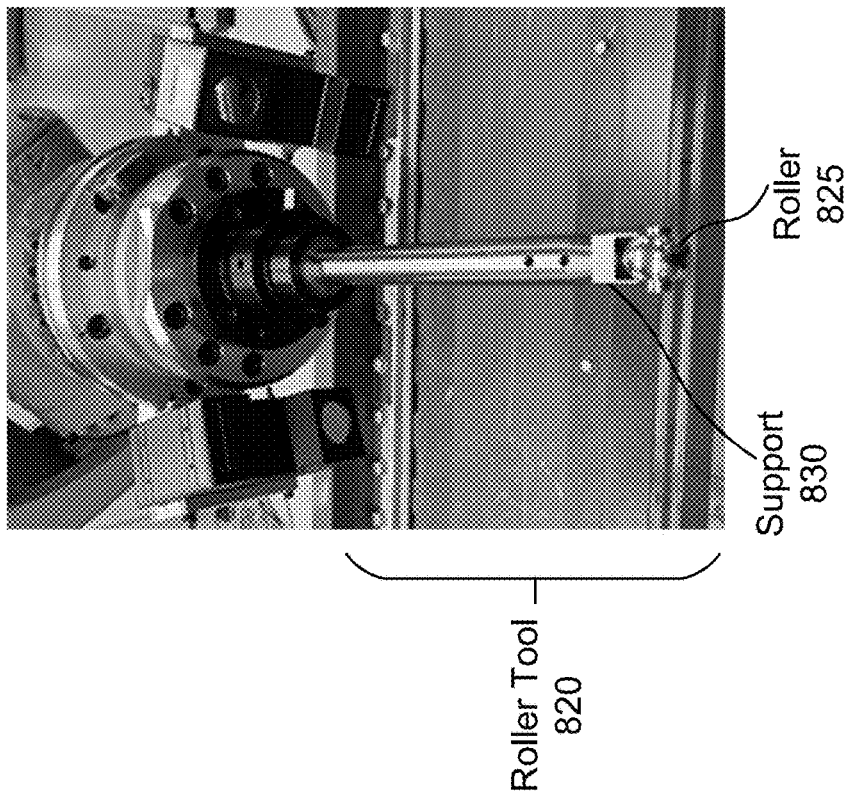
FIGS. 8A-8B are perspective views of first and second roller tools, according to some embodiments.
Figure 8A:
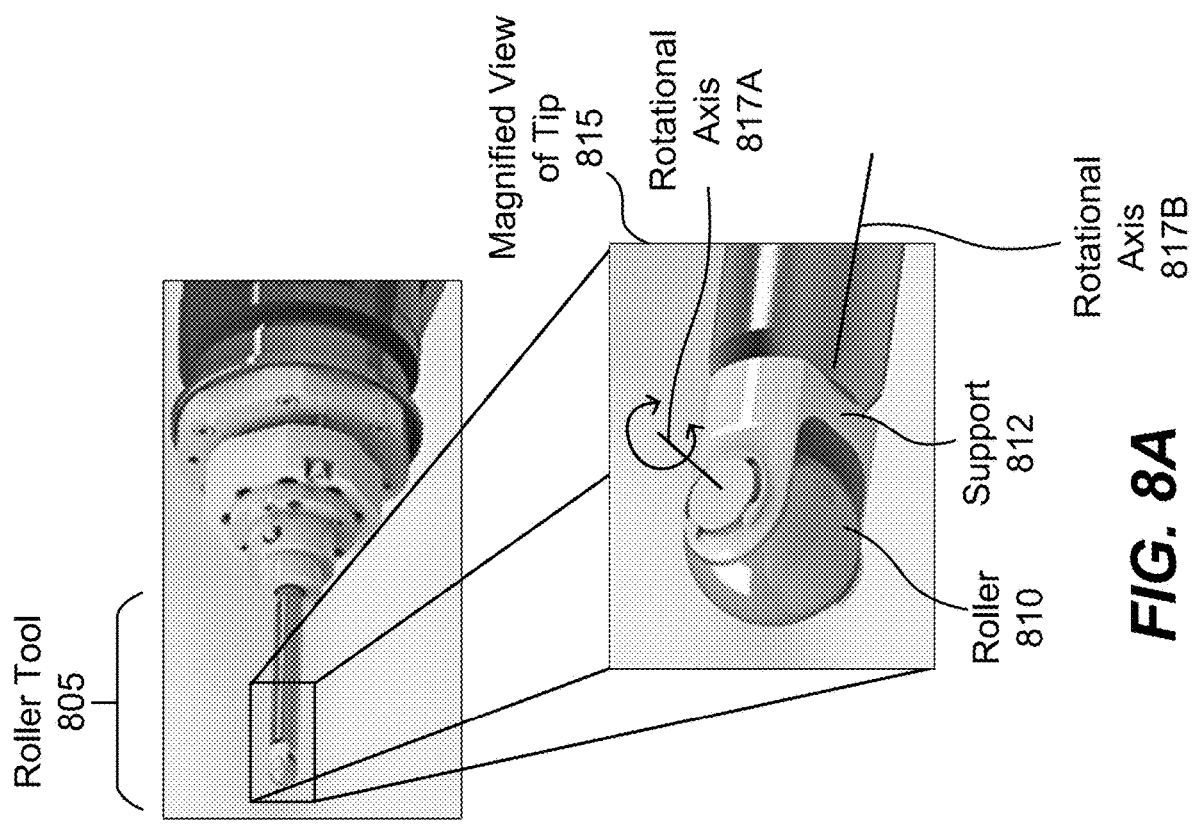
Figure 14:
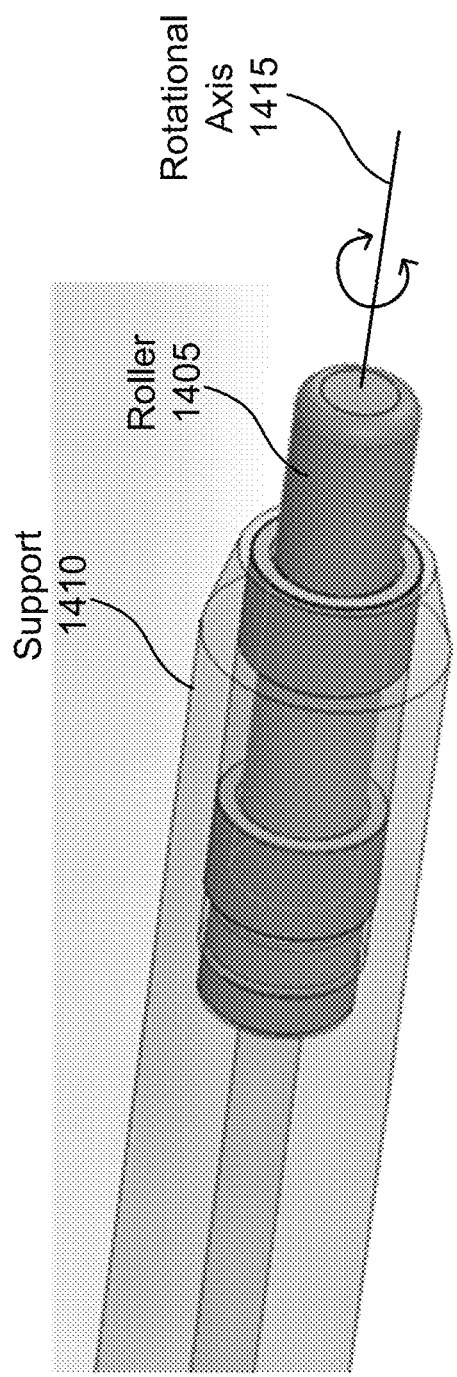
FIG. 14 is a perspective of fourth roller tool, according to an embodiment.

Other tools configured to reduce friction may include roller tools. Roller tools may result in lower friction forces than a stylus. Different rollers with different radii and shape can be used to accommodate for different features in the part design. FIGS. 8A-8B illustrate example embodiments of roller tools. FIG. 8A includes an image of a roller tool 805 coupled to a robot arm and a magnified view of the tip of the roller tool 815. The tip of the roller tool includes a roller 810 held in place by a support 812. The support allows the roller to rotate about an axis 817. FIG. 8B is an image of a larger roller tool 820. Similar to FIG. 8A, tool 820 has a roller 825 and a support 830. Another example of a single axis roller is illustrated in FIG. 14. The tool includes a roller 1405 with a support 1410. The roller can rotate about axis 1415, which is parallel to a long axis of the support.

In some embodiments, the roller can only roller about a single rotational axis (e.g., as in FIGS. 8A and 8B). However, the robotic system is controlled, via the controller, to orient the roller tool so that the roller rolls along the desired direction of movement (the desired direction of movement may be set by the program). Said differently, the roller tool may be oriented so that the rotational axis of the roller is perpendicular to the direction of movement of the roller tool. The illustrated rollers are specifically suitable for part forming with articulated 6-axis robots, since the robots can take advantage of the 6 degrees of freedom to align a roller in the direction of the movement during part forming. The roller may be held with the same mechanism as the stylus or other tools using a tool holder that is mounted at the end of the robotic arm.

Figure 13:
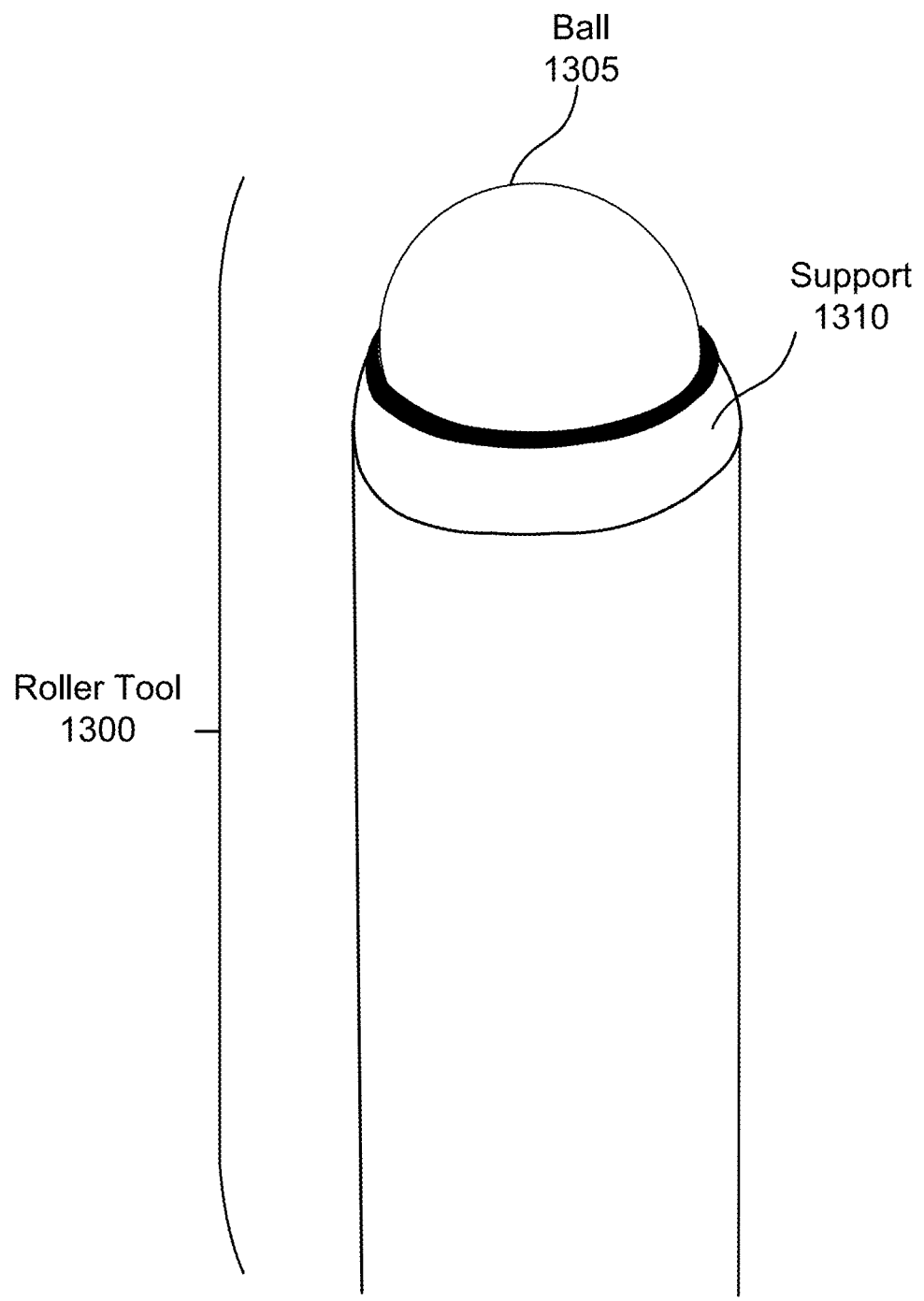
FIG. 13 is a perspective of a third roller tool, according to an embodiment.

In some embodiments, a roller tool includes a roller that can rotate about multiple rotational axes. An example, of this is illustrated in FIG. 13. FIG. 13 includes a roller tool 1300. The tool 1300 includes a ball 1305 in a socket that may be part of a support 1310 for the ball. The ball can rotate in the socket. Thus, the tool can move in different directions along a part surface without the robot rotating the support along the long axis. Due to the socket configuration, the roller tool 1300 have less friction than a stylus but more friction than a single axis roller (e.g., as illustrated in FIGS. 8A and 8B).

The disclosed roller design installed on a robotic setup allows for robotic part forming with reduced friction, hence reduced forces which then allows for better surface quality of the formed part and increased speed of the forming process.

7. Integration of Downstream Processes in the Forming Setup

Sheet metal part forming may be one of many manufacturing steps performed to produce a final sheet metal part. For example, a sheet metal part also goes through trimming, hole making, hemming, or other processing steps after the part forming process. Traditional methods involve transferring a sheet metal part from one specialized manufacturing station to another, performing each manufacturing step in each corresponding station to produce the delivering the final part. This results in increased manufacturing time due to the time for physically moving the part from one station to another.

Each of the downstream processes generally has its own specific tooling. For example, for trimming a part, it is desirable to use a geometry specific frame that can hold the geometry of the part while a trimming operation is performed.

In some embodiments, the robotic system allows for performing two or more (e.g., all) downstream manufacturing steps in the same station using the same robotic setup, thus avoiding moving of the part and decreasing the total fabrication time. Each downstream process may use a different tool. For example, when performing trimming (e.g., hole making), the robot arm may attach different tools such as a spindle, laser, or a plasma torch. The robotic arm can be controlled to automatically change the tool through software instructions of the program executed by the controller (e.g., controller 255). For example, the controller can control the robot arm at varying times throughout the process to perform a programmed operation on the sheet metal with a particular tool, to control an actuator to release a tool from the tool holder (e.g., into a tool rack), and to cause the robot arm to attach a new tool from the tool holder (e.g., from the tool rack) for performing a subsequent operation.

In some embodiments, the steps that enable automatic integration of downstream processes in the same station may include the following. (1) the robot goes to a tool rack and picks up a forming tool (e.g., a stylus) using predefined software instructions sent to the robot. (2) the robot forms a part from a flat sheet of metal through software defined path and parameters. (3) After the part is formed, the robot moves back to the tool rack, disengages (e.g., drops) the forming tool, and picks up a trimming tool. This step may also be automated with software instructions. (4) The robot performs a trimming operation on the part with the trimming tool. If further downstream processes, such as hemming (e.g., bending), are used to finish the part, the system may continue from step 3 until no more processes are left to perform. If a station includes multiple robots, the robots may work in conjunction using the same or different tools to achieve a desired process (e.g., a forming or trimming process).

If a manufacturing area includes multiple cells (e.g., each including two robot arms), instead of each cell changing tools to perform different operations, each cell may be assigned to a specific operation. In these embodiments, a part may be moved from one cell to another after each operation on the part is complete.

FIG. 10 includes images of various manufacturing processes described above. FIG. 10A illustrates a robot arm 1000 forming a deformation 1005 by pressing a stylus 1010 against a piece of sheet metal 1015. FIG. 10B illustrates the robot arm 1000 with a trimming tool 1020. The trimming tool is used to cut a hole 1025 in a portion of the deformation. To determine the location of the hole, a controller of the arm (e.g., controller 255) may compare a design of the deformation (e.g., in a computer-aided design file) with the current geometry of the deformation (the current geometry may be determined from sensor data). For example, after the deformation is formed, the robot picks up a scanner sensor, scans the deformation and, based on a design of the deformation, determines the path to trim the deformation. After that, the robot may pick up a trimming tool. FIG. 10C illustrates the robot arm 1000 with a hemming tool 1030. The hemming tool is used to bend a corner of a part 1035. FIG. 10D is a perspective view of a tool rack 1040 holding a plurality of tools 1045. The rack may be placed near a robot arm (e.g., arm 1000) so that the arm can exchange tools. In the example of FIG. 10D, tools 1045A and 1045B are styli and tool 1045C is a roller tool.

8. Frame

Figure 9:
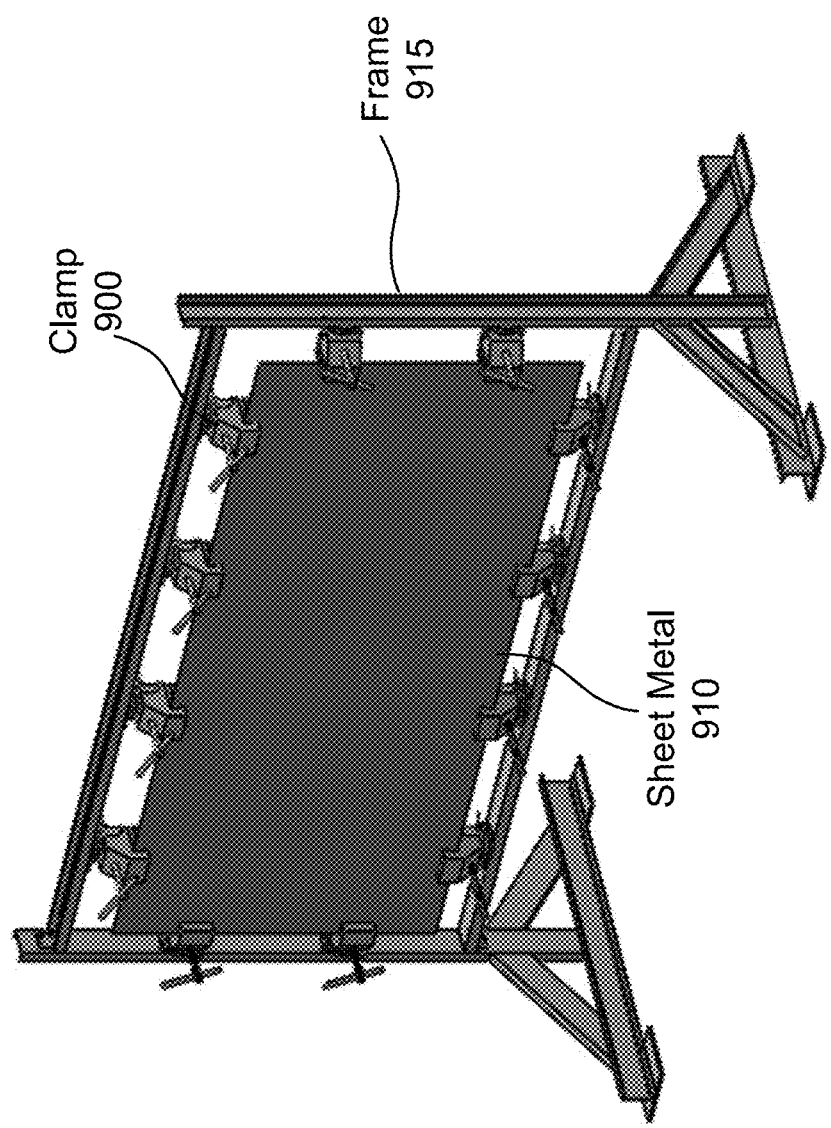
FIG. 9 is a perspective view of a frame holding a sheet, according to an embodiment.
Figure 10A:
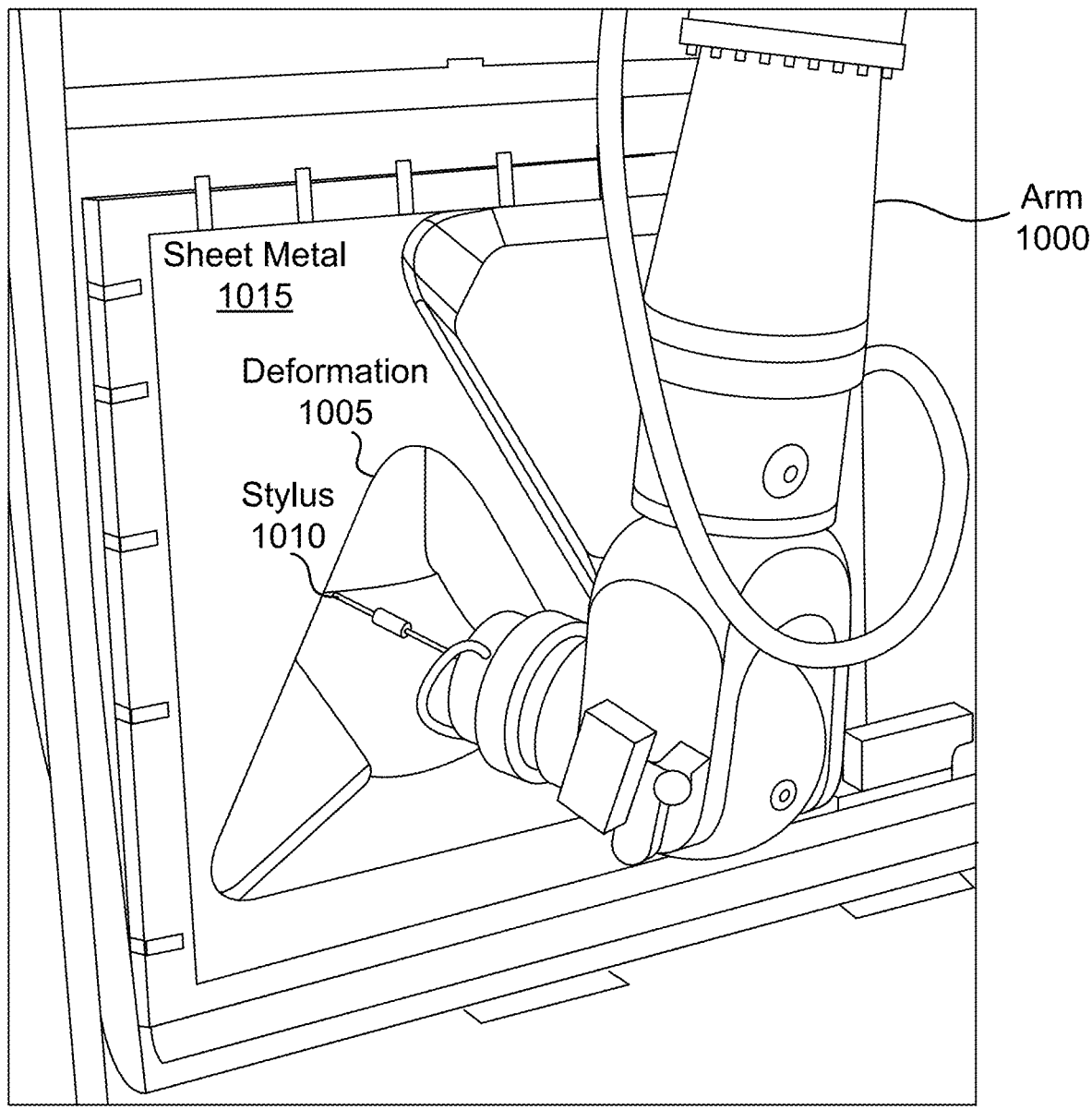
FIG. 10A is a perspective view of a robot arm with a stylus performing a forming operation, according to an embodiment.
Figure 10B:
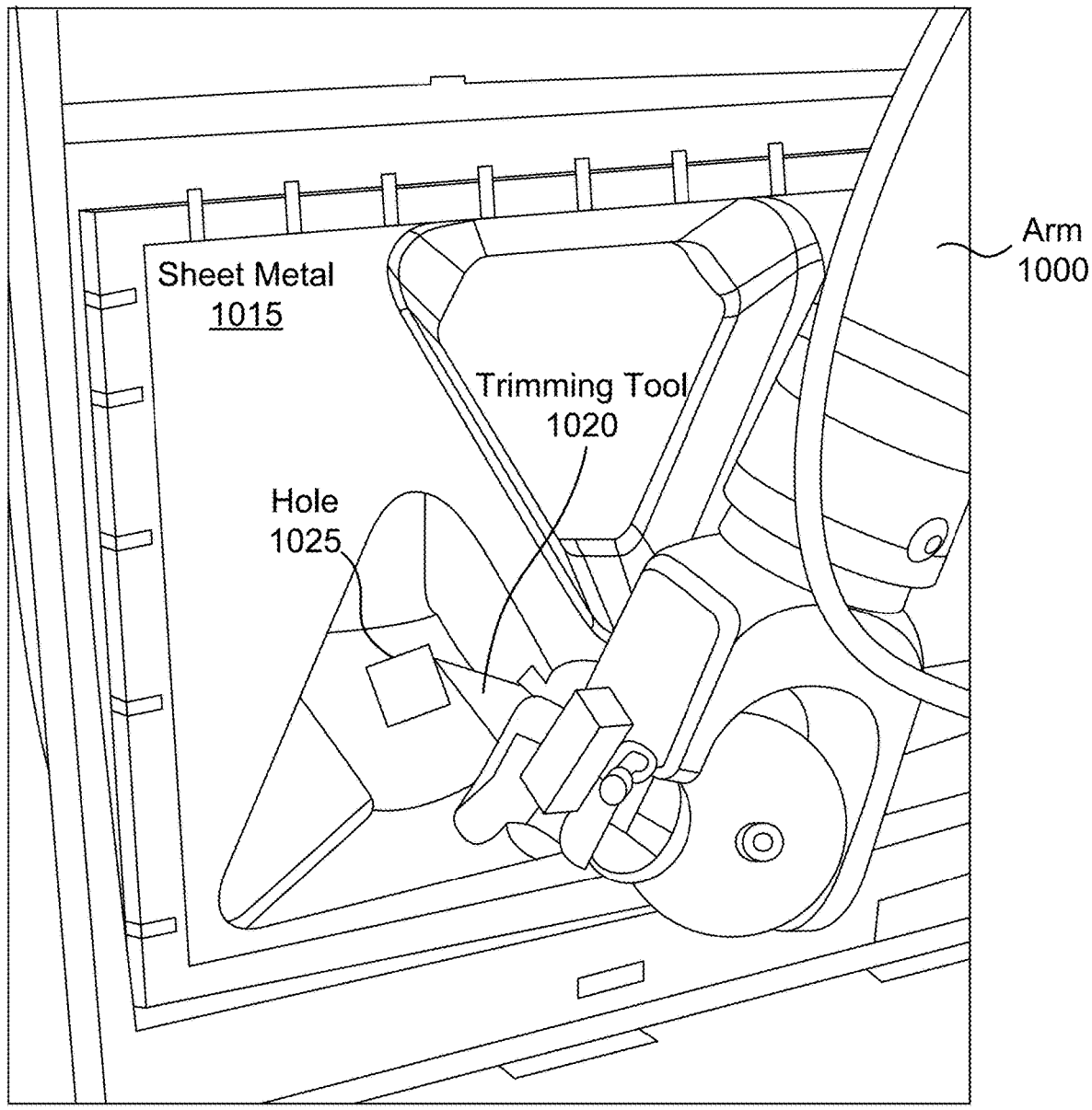
FIG. 10B is a perspective view of a robot arm with a trimming performing a trimming operation, according to an embodiment.
Figure 10C:
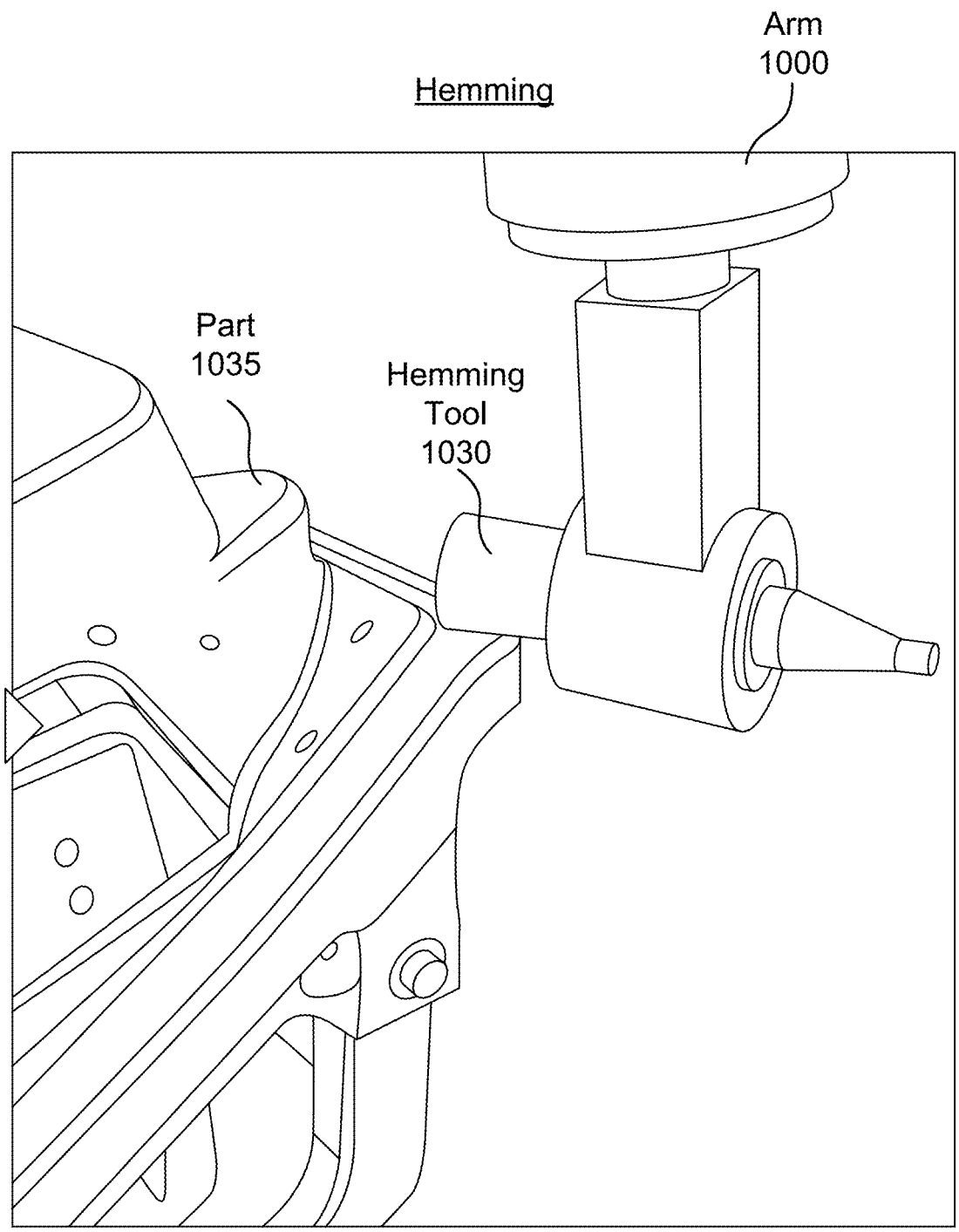
FIG. 10C is a perspective view of a robot arm with a hemming performing a hemming operation, according to an embodiment.
Figure 10D:
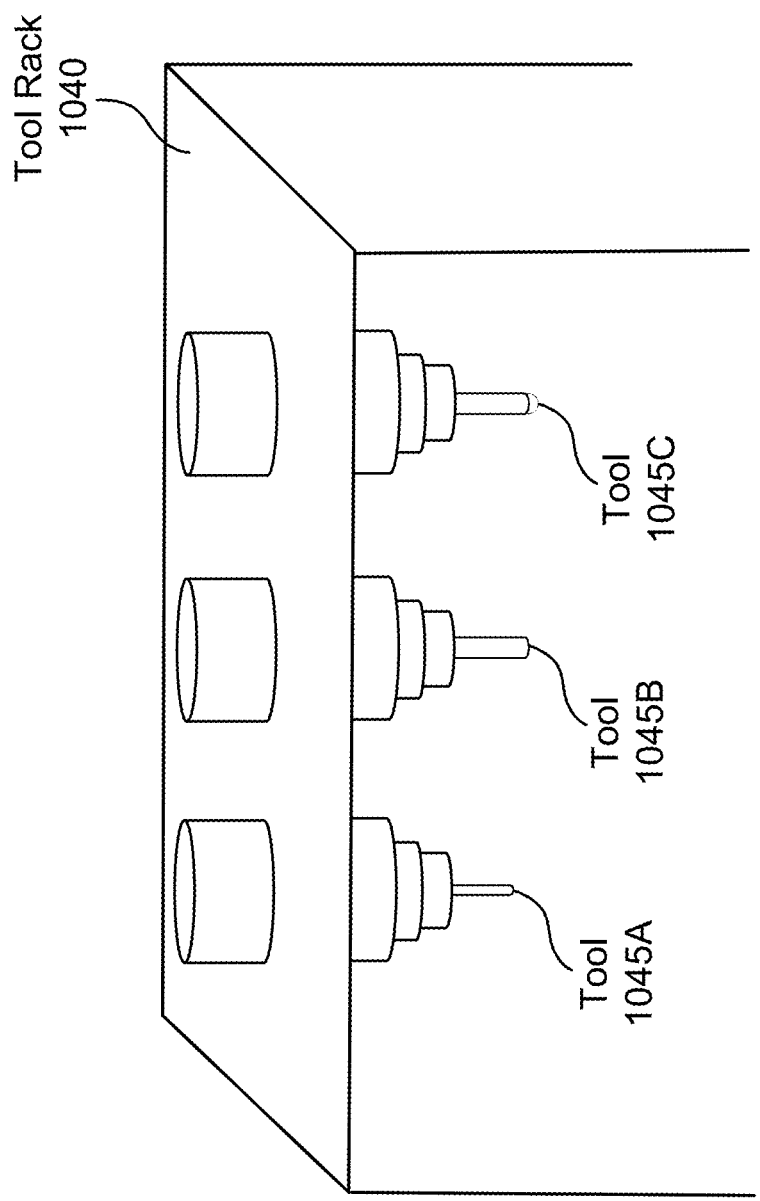
FIG. 10D is a perspective view of a tool rack holding a plurality of tools, according to an embodiment.

FIG. 9 is a perspective view of a frame 915 (also referred to as a fixture), according to an embodiment. In the example of FIG. 9, the frame 915 includes a series of clamps 900 that hold the sheet metal 910 in place. Specifically, the frame surrounds the edges of the sheet metal and the clamps are clamped to edge portions of the sheet metal 910. The clamps may be hydraulic or electric (e.g., servo). The clamps may be electronically operated. The frame and clamps may be sturdy enough to hold the sheet metal in place as the robot arms apply different processes (e.g., deformation forces) to the sheet. The frame enables access to large sections of the sheet metal 910 with robotic arms. Thus, it may eliminate the need for any method-specific modification in the fixture that is traditionally required with downstream operation from sheet forming.

Thus, the stand design and software-controlled tool changer for controlling the robotic arms allows for automated downstream operations from forming of the sheet metal parts such as trimming, bending, and hemming without removing the part from the fixture and requiring geometry specific fixture.

9. Ultrasonic Vibration System

In some embodiments, a flexible manufacturing system selectively and precisely treats certain regions of a (e.g., geometrically complex) metal part to modify its material properties, such as hardness. The system and process can reduce reliance on geometry specific tooling relative to conventional techniques, thereby reducing the cost and timing for manufacturing (e.g., sheet) metal parts. The described system and process achieves these outcomes without substantially raising the temperature of the part.

Embodiments may utilize ultrasonic vibrations, delivered through industrial robotic arms and industrial controls, to enable high precision conditioning of metal parts to deliver high performing parts at lower fabrication time and cost. Ultrasonic vibrations in include vibrations with frequencies in the range of twenty kHz to three gigahertz. The vibrations can treat a region at room temperature and the vibrations may change the temperature of the region by less than 10° C.

The disclosed surgical metal conditioning technology (SMCT), enables similar or better, strengthening results compared to traditional heat treatment methods without the need to raise the temperature and without its respective side effects. The ultrasonic vibration system may include a robotic kinematic system, an ultrasonic end effector, process monitoring sensors, and a controller. In some embodiments, the ultrasonic system has a small spatial footprint that allows its easy integration with existing production lines in metal manufacturing. It can also be used with emerging fabrication methods like additive manufacturing to help with wider adoption of these new technologies through delivering desired properties in feedstock and final part.

9.1 Components of Ultrasonic Vibration System

Figure 11:
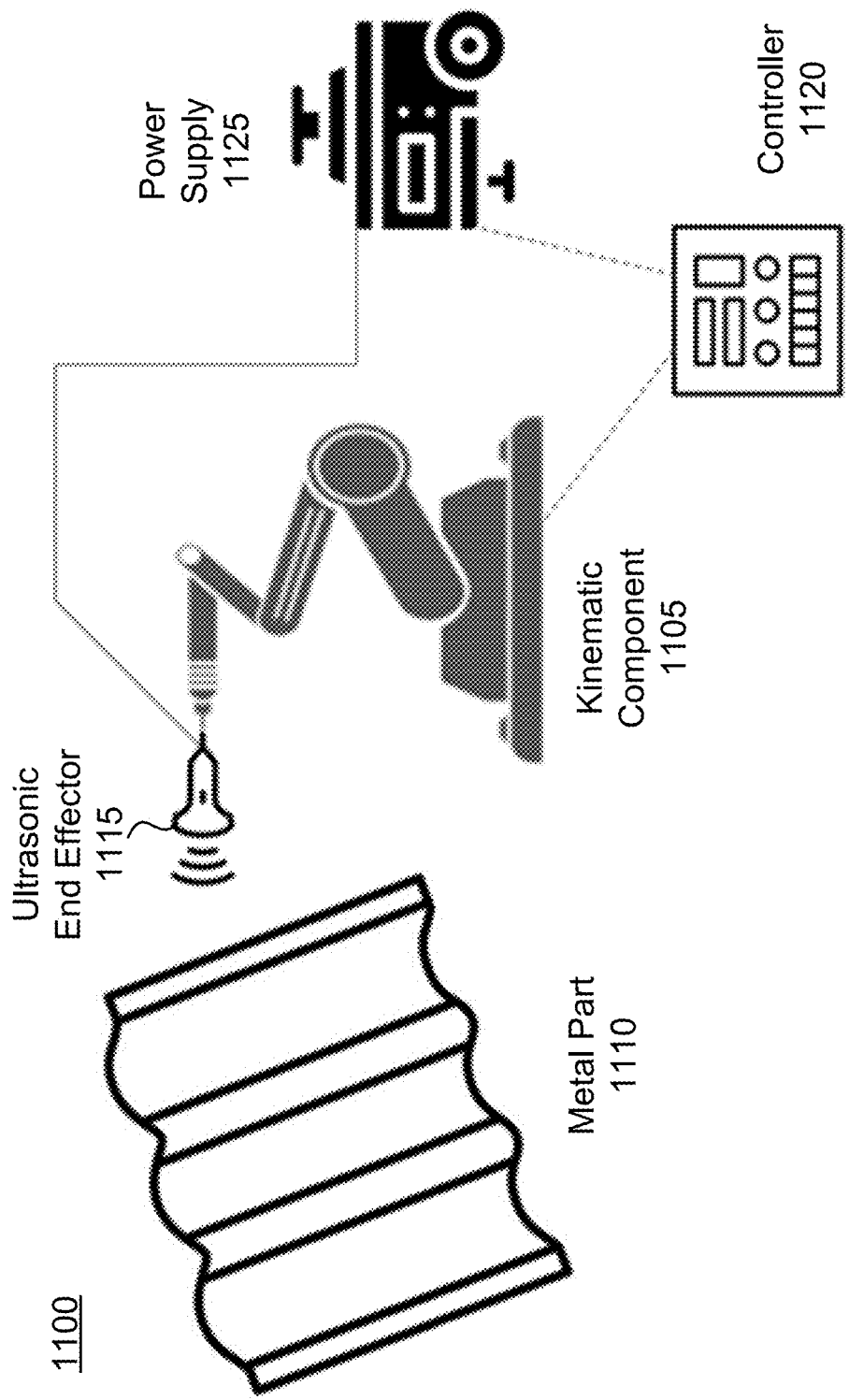
FIG. 11 illustrates components of an ultrasonic vibration system, according to an embodiment.

The system 1100 may include four components as illustrated in FIG. 11. A kinematic component 1105 (e.g., an industrial robotic system) has the ability to reach different areas of a (e.g., complex) metal part (e.g., via programmatic software interface). An ultrasonic end effector 1115 (e.g., an ultrasonic transducer) coupled to the kinematic component can deliver ultrasonic vibrations to the metal part with tuned parameters (e.g., power, frequency, time of treatment, and the angle of end effector). The kinematic component may have a small form factor so that it can be coupled to (e.g., attached to or installed on) an end of the kinematic component (e.g., an end of a robotic arm) and moved with precision in space. A controller 1120 (also referred to as a control unit) enables control over process parameters such as travel, speed, power, and frequency. Process monitoring sensors evaluate the result of the treatment and actively control the process. The components of the system 1100 are described in further detail below.

9.2 Robotic System

Articulated robots may be used as the kinematic component 1105. The industrial robots may provide broad movement range, flexibility, and small footprint. They allow for precise delivery of ultrasonic treatment to the intended area of the part. The robotic cell includes one or more heterogeneous, 6-axis robots mounted on linear tracks and a real-time monitoring and control system. If the cell includes multiple robots, the robots may work in coordination with each other to deliver ultrasonic treatment to different areas of the part (e.g., based on an input CAD file). The controller 1120 may monitor the treatment operation in real-time and assesses its effect against the desired treatment. The feedback may be actively used to update the robotic movement.

9.3 Control System

The controller 1120 obtains the geometry of the part 1110 and signals from various sensors installed on the robot or the part. The robot (e.g., 1105) is controlled to interact with the part in accordance with a program applied by the controller to result in a desired geometry. For example, the program controls the robot arms to move in a particular sequence (e.g., along a predefined path) and apply the ultrasonic end-effector to the part according to particular programmed parameters at each step of the sequence. The controller 1120 may be coupled to a power supply 1125 with knobs or automated software controls to control the frequency and the power of ultrasonic vibrations in real time through a software interface. For example, the controller may control a frequency, amplitude, or other operational parameters of the ultrasonic end-effector to achieve a desired material property at different locations on the part. As previously described, the program may also cause the robot to utilize other tools to bend, pinch, cut, heat, seam, or other form the metal in accordance with the program. During the part forming process, the controller may receive and process sensor data from the sensors to determine the proper joint values for each axis in the robotic arm, the ultrasonic end-effector parameters, or other operational parameters, to control the robot arms and end effector accordingly. For example, the sensors may sense the hardness and, based on the sensor data, the controller may control the ultrasonic end-effector (e.g., ultrasonic parameter values) to achieve the programmed hardness.

Depending on the ultrasonic parameter values and the material of the part, the vibrations may harden or soften a region of the part. For example, with 7xxx aluminum, low power ultrasonic vibrations can harden the metal, but if the power is increased above a threshold level, the vibrations will heat the meal, which anneals (softens) the material.

9.4 Ultrasonic End-Effector

The ultrasonic apparatus or end-effector 1115 is a tool attachable to a tool holder of the kinematic component 1105. The ultrasonic end effector may include piezoelectric disks, front mass, back mass, ultrasonic horn, fixtures, and frames. It can deliver a wide range of power and frequencies to the part 1110. Different designs of the ultrasonic horn and coupling element also allows for a controllable treatment footprint.

Figure 12:
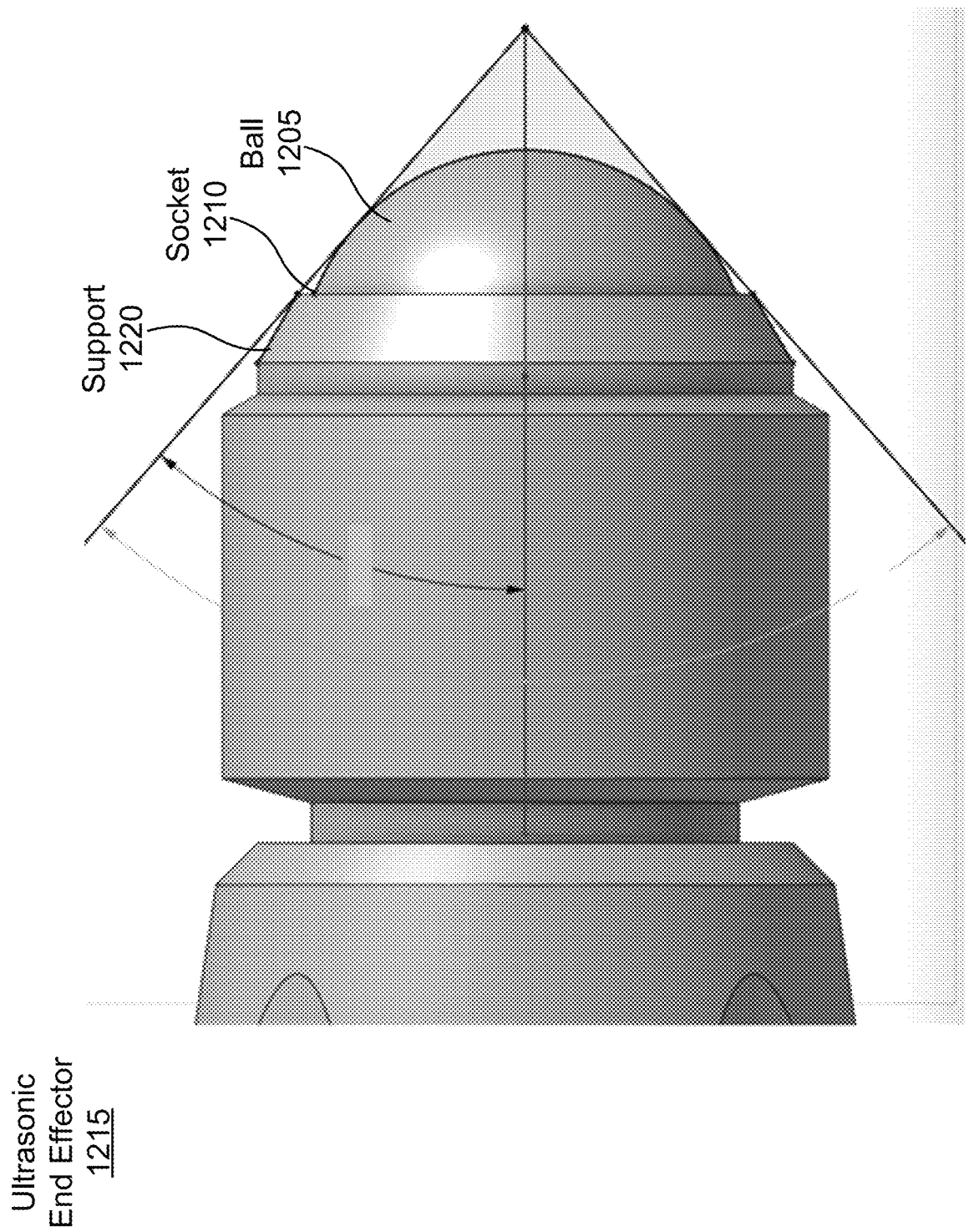
FIG. 12 is a side view of an ultrasonic end effector, according to an embodiment.

Generally, the ultrasonic end effector includes a transducer that vibrates a component to apply vibrations to a region of a part. FIG. 12 illustrates and example ultrasonic end effector 1215. The end effector 1215 includes a ball 1205 in a socket 1210 formed by a support 1220. Although not illustrated, a mechanical transducer is located in the socket. The transducer can vibrate the ball. Thus, ultrasonic vibrations may be delivered to a local region by pressing the ball against the part without affecting other regions of the part. The diameter of the ball may determine the size of the treatment region. For example, the end effector can apply vibrations to a region with a diameter of a quarter of an inch. Other end effector configurations, such as different size balls, may enable smaller or larger regions to be treated with vibrations. Although the example of FIG. 12 includes a ball in a socket, other configurations are possible. For example, an ultrasonic end effector may include a component with a rounded surface (or another shaped surface) that is coupled to a transducer.

9.5 Process Monitoring

Process monitoring includes sensors that can measure ultrasonic vibration and temperature in the part and end effector. For example, thermocouples and thermal cameras can detect the temperature and the ultrasonic vibration can be measured through the power supply 1125. The sensors may also include, for example, accelerometers, gyroscopes, pressure sensors, or other sensors for detecting motion, position, and interactions of the robot with the sheet metal.

9.6 Process Description

In an example process, the process starts by identifying the local areas (also referred to as sections or portions) of the metal part 1110 with properties that are programmed to be changed in accordance with a desired final part. These areas may be based on the properties desirable for downstream operations like forming, machining, etc. For example in order to stretch certain areas in a later forming operation, those areas may be softened via ultrasonic vibrations. The control unit 1120 generates commands for the robot to bring the ultrasonic end effector 1115 near the identified region. The control unit will then command the power supply 1125 to power up the end effector to the frequency and power that generates the desired properties in the material. These frequency and power values may be determined using empirical and machine learning models built through design of experiments done previously. The design of the experiment may also determine the time of treatment and the angle of end effector. The time and angle are enforced through commands sent by the controller to the robot to align the end effector and movement at the correct speed so each area gets the appropriate amount of treatment for the desired effect.

10. Example Machine Architecture

Figure 17:
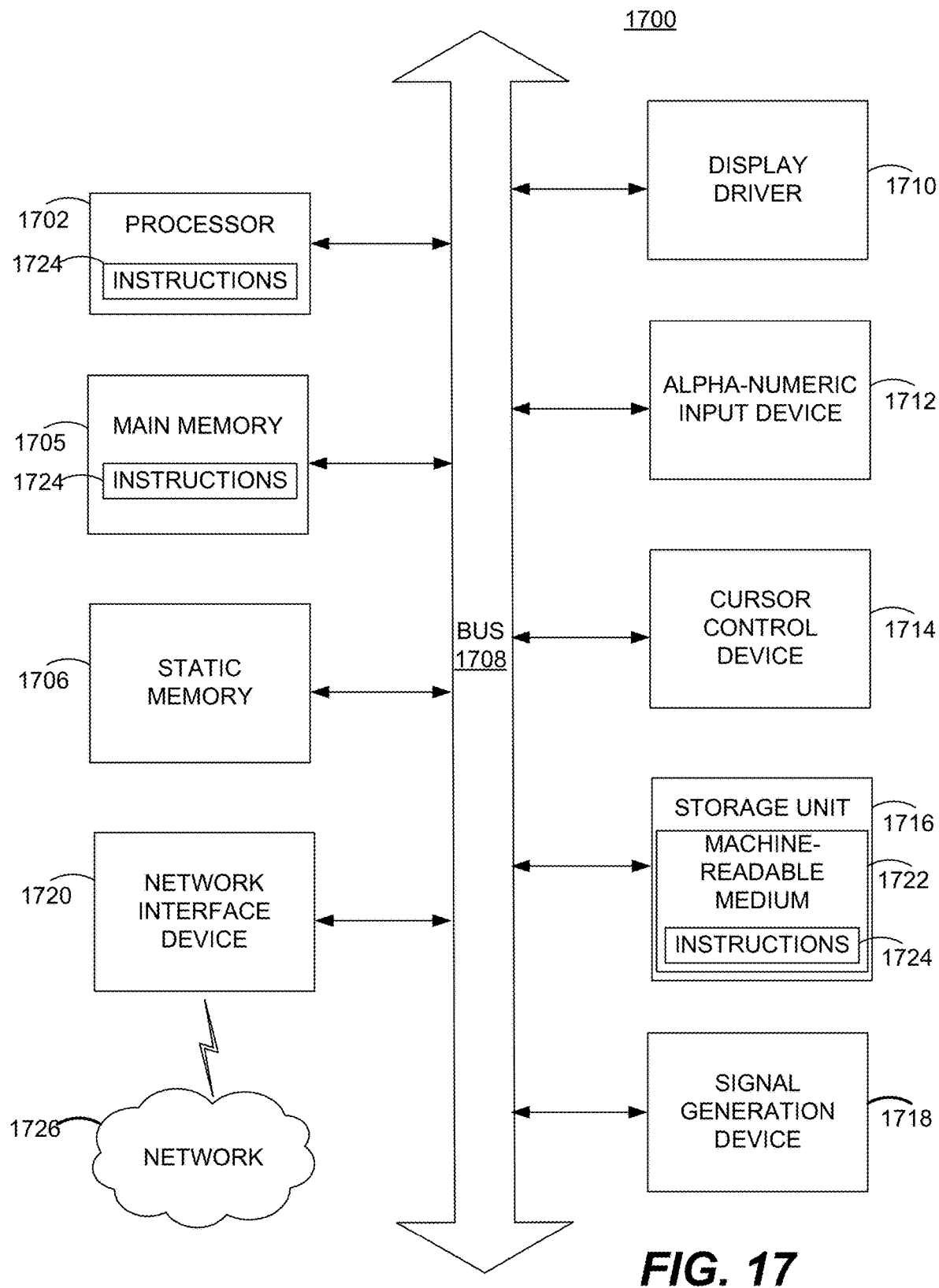
FIG. 17 is a block diagram illustrating components of an example machine able to read instructions from a machine-readable medium and execute them in a processor, according to an embodiment.

In some embodiments, the controller (e.g., controller 255 or controller 1120) is a machine able to read instructions from a machine-readable medium and execute them in a processor. FIG. 17 is a block diagram illustrating components of an example machine able to read instructions from a machine-readable medium and execute them in a processor. Specifically, FIG. 17 shows a diagrammatic representation of a machine in the example form of a computer system 1700. The computer system 1700 can be used to execute instructions 1724 (e.g., program code or software) for causing the machine to perform any one or more of the methodologies (or processes) described herein. In alternative embodiments, the machine operates as a standalone device or a coupled (e.g., networked) device that connects to other machines. In a networked deployment, the machine may operate in the capacity of a server machine or a client machine in a server-client network environment, or as a peer machine in a peer-to-peer (or distributed) network environment. Here, the robots, e.g., 400A, 400B, and other automated components may include all or a portion of the component of the described computer system (or machine) 1700. The robots, e.g., 400A, 400B, and/or other automated components may be programmed with program code to operate as described with FIGS. 1-16B. Such operation also include program code corresponding to the disclosed models, e.g., 1600, 1615, for effecting the resulting geometries through the robots, e.g., 400A, 400B and other automated components.

The machine may be a server computer, a client computer, a personal computer (PC), a tablet PC, a smartphone, an internet of things (IoT) appliance, a network router, or any machine capable of executing instructions 1724 (sequential or otherwise) that specify actions to be taken by that machine. Further, while only a single machine is illustrated, the term "machine" shall also be taken to include any collection of machines that individually or jointly execute instructions 1724 to perform any one or more of the methodologies discussed herein.

The example computer system 1700 includes one or more processing units (generally processor1702). The processor 1702 is, for example, a central processing unit (CPU), a graphics processing unit (GPU), a digital signal processor (DSP), a state machine, one or more application specific integrated circuits (ASICs), one or more radio-frequency integrated circuits (RFICs), or any combination of these. The processor 1702 also may be a controller. The controller may include a non-transitory computer readable storage medium that may store program code to operate (or control) the robots, e.g., 400A, 400B, and/or other automated components described herein.

For convenience, the processor 1702 is referred to as a single entity but it should be understood that the corresponding functionality may be distributed among multiple processors using various ways, including using multi-core processors, assigning certain operations to specialized processors (e.g., graphics processing units), and dividing operations across a distributed computing environment. Any reference to a processor 1702 should be construed to include such architectures.

The computer system 1700 also includes a main memory 1704. The computer system may include a storage unit 1716. The processor 1702, memory 1704 and the storage unit 1716 communicate via a bus 1708.

In addition, the computer system 1700 can include a static memory 1706, a display driver 1710 (e.g., to drive a plasma display panel (PDP), a liquid crystal display (LCD), or a projector). The computer system 1700 may also include alphanumeric input device 1712 (e.g., a keyboard), a cursor control device 1714 (e.g., a mouse, a trackball, a joystick, a motion sensor, or other pointing instrument), a signal generation device 1718 (e.g., a speaker), and a network interface device 1720, which also are configured to communicate via the bus 1708.

The storage unit 1716 includes a machine-readable medium 1722 on which is stored instructions 1724 (e.g., software) embodying any one or more of the methodologies or functions described herein. The instructions 1724 may also reside, completely or at least partially, within the main memory 1704 or within the processor 1702 (e.g., within a processor's cache memory) during execution thereof by the computer system 1700, the main memory 1704 and the processor 1702 also constituting machine-readable media. The instructions 1724 may be transmitted or received over a network 1726 via the network interface device 1720.

While machine-readable medium 1722 is shown in an example embodiment to be a single medium, the term "machine-readable medium" should be taken to include a single medium or multiple media (e.g., a centralized or distributed database, or associated caches and servers) able to store the instructions 1724. The term "machine-readable medium" shall also be taken to include any medium that is capable of storing instructions 1724 for execution by the machine and that cause the machine to perform any one or more of the methodologies disclosed herein. The term "machine-readable medium" includes, but not be limited to, data repositories in the form of solid-state memories, optical media, and magnetic media.

While machine-readable medium 722 (also referred to as a computer-readable storage medium) is shown in an embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" shall also be taken to be a non-transitory machine-readable medium. The term "machine-readable medium" includes, but not be limited to, data repositories in the form of solid-state memories, optical media, and magnetic media.

11. Additional Considerations

Embodiments of the system and/or method can include every combination and permutation of the various system components and the various method processes.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate+/−10% unless another meaning is apparent from the context. From example, "approximately ten" should be understood to mean "in a range from nine to eleven."

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by any claims that issue.

What is claimed is:

1. A system configured to form a sheet in an initial geometry into a desired geometry different than the initial geometry, the system comprising:
    a robot arm with an end effector;
    a model configured to:
        receive an input geometry of the sheet;
        receive an input parameter value indicating a first interaction between the sheet and the end effector, the first interaction including the end effector performing at least one of: bending, pinching, seaming, or stretching a portion of the sheet by being pressed into the portion of the sheet; and
        determine an output geometry of the sheet based on the input geometry and the input parameter value; and
    a controller coupled to the robot arm and the model, the controller configured to:
        (i) receive the initial geometry of the sheet and the desired geometry of the sheet;
        (ii) apply the model to the initial geometry and to different input parameter values;
        (iii) determine, based on output geometries of the model, a set of one or more parameter values for controlling the robot arm; and
        (iv) control the robot arm according to the determined set of one or more parameter values to form the sheet into the desired geometry using the end effector.

2. The system of claim 1, wherein:
    the system further includes a second robot arm with a second end effector, the second robot arm located on an opposite side of the sheet relative to the robot arm; and
    the controller is further configured to control the second robot arm in conjunction with the robot arm to form the sheet into the desired geometry.

3. The system of claim 2, wherein the model is configured to determine the output geometry of the sheet based on the input geometry, the input parameter value, and a second input parameter value that indicates a second interaction between the sheet and the second end effector, the second interaction between the sheet and the second end effector including the second end effector performing at least one of: bending, pinching, cutting, seaming, or stretching a second portion of the sheet by being pressed into the second portion of the sheet.

4. The system of claim 1, wherein the end effector includes a stylus configured to deform the sheet to form the desired geometry.

5. The system of claim 4, wherein the input parameter value indicates the stylus exerting a force on the portion of the sheet.

6. The system of claim 1, wherein the model is a machine learned model.

7. The system of claim 6, wherein the model is trained using data generated by a physics simulator.

8. The system of claim 6, wherein the model is trained using data generated by sensors on the robot arm or another robot arm.

9. The system of claim 6, wherein the model is trained using data generated from scanning another sheet that was previously formed from a first geometry into a second geometry different than the first geometry.

10. The system of claim 1, wherein the input parameter value includes: a path of the end effector, a speed of the end effector, a geometry of the end effector, an amount of force exerted by the end effector onto the sheet, an angle of the end effector, or a position of the end effector.

11. The system of claim 1, wherein receiving the initial geometry of the sheet comprises:
    receiving sensor data from a sensor mounted to the robot arm; and
    determining the initial geometry based on the sensor data.

12. The system of claim 11, wherein the sensor is a load sensor, and the sensor data indicates a previous interaction between the sheet and the end effector.

13. The system of claim 1, wherein the controller is further configured to:
    receive sensor data from a sensor mounted to the robot arm;
    determine a current geometry of the sheet based on the sensor data;
    receive a second desired geometry different than the current geometry;
    define the current geometry as the initial geometry and define the second desired geometry as the desired geometry; and
    repeat steps (i)-(iv).

14. The system of claim 1, wherein the desired geometry is predetermined using the model and an optimization process.

15. The system of claim 1, wherein the different input parameter values are determined using the model and an optimization process.

16. The system of claim 1, wherein to apply the model to the initial geometry and to the different input parameter values, the controller is further configured to:
    apply the model to an initial parameter value;
    receive an output geometry determined by the model based on the initial parameter value;
    compare the output geometry with the desired geometry; and
    determine an updated parameter value based on the comparison.

17. The system of claim 1, wherein to determine the set of one or more parameter values, the controller is further configured to:
compare the output geometries of the model with the desired geometry; and
determine the set of one or more parameter values based on the comparison.

18. The system of claim 1, wherein the first interaction additionally includes the end effector heating the portion of the sheet.

19. A method of controlling a robot arm with an end effector to form a sheet in an initial geometry into a desired geometry different than the initial geometry, the method comprising:
receiving the initial geometry of the sheet and the desired geometry of the sheet;
applying a model to the initial geometry and to input parameter values, the model configured to:
receive an input geometry of the sheet;
receive an input parameter value indicating an interaction between the sheet and the end effector, the interaction including the end effector performing at least one of: bending, pinching, seaming, or stretching a portion of the sheet by being pressed into the portion of the sheet; and
determine an output geometry of the sheet based on the input geometry and the input parameter value;
based on output geometries of the model, determining a set of one or more parameter values for controlling the robot arm; and
controlling the robot arm according to the determined set of one or more parameter values to form the sheet into the desired geometry using the end effector.

20. A non-transitory computer-readable storage medium comprising stored instructions that, when executed by a computing device, cause the computing device to perform operations comprising:
receiving an initial geometry of a sheet and a desired geometry of the sheet;
applying a model to the initial geometry and to input parameter values, the model configured to:
receive an input geometry of the sheet;
receive an input parameter value indicating an interaction between the sheet and an end effector coupled to a robot arm, the interaction including the end effector performing at least one of: bending, pinching, seaming, or stretching a portion of the sheet by being pressed into the portion of the sheet; and
determine an output geometry of the sheet based on the input geometry and the input parameter value;
based on output geometries of the model, determining a set of one or more parameter values for controlling the robot arm; and
controlling the robot arm according to the determined set of one or more parameter values to form the sheet into the desired geometry using the end effector.

* * * * *